US008675581B2

(12) United States Patent
Chen et al.

(10) Patent No.: US 8,675,581 B2
(45) Date of Patent: Mar. 18, 2014

(54) APPARATUSES AND METHODS FOR ENHANCING DATA RATE FOR PACKET-SWITCHED (PS) DATA SERVICE

(75) Inventors: Hung-Yueh Chen, Taipei (TW); Ming-Wan Hsu, Taipei (TW); Sian-Jheng Wong, Yizhu Township, Chiayi County (TW); Yi-Ting Chang, Zhubei (TW)

(73) Assignee: Mediatek Inc., Hsin-Chu (TW)

( * ) Notice: Subject to any disclaimer, the term of this patent is extended or adjusted under 35 U.S.C. 154(b) by 227 days.

(21) Appl. No.: 13/210,305

(22) Filed: Aug. 15, 2011

(65) Prior Publication Data

US 2013/0044609 A1 Feb. 21, 2013

(51) Int. Cl.
*H04W 4/00* (2009.01)
(52) U.S. Cl.
USPC .......................................... 370/329; 370/341
(58) Field of Classification Search
None
See application file for complete search history.

(56) References Cited

U.S. PATENT DOCUMENTS

| | | | | |
|---|---|---|---|---|
| 8,140,876 B2* | 3/2012 | Arnold et al. | ................. | 713/320 |
| 8,200,225 B2* | 6/2012 | Huang et al. | ................. | 455/436 |
| 8,244,301 B2* | 8/2012 | Shi | ................. | 455/558 |
| 2007/0110095 A1* | 5/2007 | Attar et al. | ................. | 370/458 |
| 2009/0099211 A1* | 4/2009 | Kassab et al. | ............. | 514/262.1 |
| 2012/0115545 A1* | 5/2012 | Middleton | ................. | 455/558 |
| 2012/0178500 A1* | 7/2012 | Hwang | ................. | 455/558 |
| 2013/0064176 A1* | 3/2013 | Hsu et al. | ................. | 370/328 |

* cited by examiner

*Primary Examiner* — Chi Pham
*Assistant Examiner* — Soon-Dong D Hyun
(74) *Attorney, Agent, or Firm* — McClure, Qualey & Rodack, LLP

(57) ABSTRACT

A wireless communication device for eliminating performance degradation of a packet-switched (PS) data service. The device comprises a processor configured to receive a request to perform the PS data service with a first subscriber identity card, reduce a plurality of scheduled monitoring tasks associated with a second subscriber identity card, and perform the PS data service with the first subscriber identity card while using the reduced plurality of scheduled monitoring tasks to maintain mobility or receive network messages with the second subscriber identity card.

20 Claims, 20 Drawing Sheets

APPARATUSES AND METHODS FOR ENHANCING DATA RATE FOR PACKET-SWITCHED (PS) DATA SERVICE

BACKGROUND OF THE INVENTION

1. Field of the Invention

The invention generally relates to methods and apparatuses for enhancing the data rate for a packet-switched data service, and more particularly, for enhancing the data rate for the packet-switched data service with a first subscriber identity card while a second subscriber identity card is performing a scheduled measurement to maintain mobility or receive network messages.

2. Description of the Related Art

With growing demand for ubiquitous computing and networking, various wireless communication technologies have been developed, such as the Global System for Mobile communications (GSM) technology, General Packet Radio Service (GPRS) technology, Enhanced Data rates for Global Evolution (EDGE) technology, Universal Mobile Telecommunications System (UMTS) technology, Wideband Code Division Multiple Access (W-CDMA) technology, Code Division Multiple Access 2000 (CDMA 2000) technology, Time Division-Synchronous Code Division Multiple Access (TD-SCDMA) technology, Worldwide Interoperability for Microwave Access (WiMAX) technology, Long Term Evolution (LTE) technology, Long Term Evolution-Advanced (LTE-A) technology, Time-Division LTE (TD-LTE) technology, and others. Generally, a cellular phone only supports one wireless communication technology and provides a user the flexibility of mobile communications at all times via the supported wireless communication technology, regardless of his/her geographic location. Specifically in today's business world, a cellular phone is a necessary business tool for conducting business conveniently. For business people, having an additional cellular phone exclusive for business matters is a common choice, since they need to conduct business while being out of the office or even out of the city/country. Others may find having an additional cellular phone as a good way to save/control the budget for wireless service charges (including phone services and/or data services). However, having two or more than two cellular phones may be troublesome when one has to switch frequently between the cellular phones and carry around all the cellular phones with himself/herself. In order to provide a convenient way of having multiple subscriber numbers, dual-card or multiple-card cellular phones have been developed, which generally have two or more wireless communication modules for respectively performing wireless transmission and reception with an individual subscriber number. The dual-card or multiple-card design allows the wireless communication modules to be active simultaneously and allows calls to be received on either subscriber numbers associated with one of the wireless communication modules at any time. Thus, a dual-card or multiple-card cellular phone may be used for business and personal use with separate subscriber numbers and bills, or for travel with the second subscriber number for the country visited.

For the dual-card or the multiple-card cellular phones with one single transceiver, only one wireless communication module is allowed to obtain network resources using the single transceiver, while the other wireless communication module has no control over the single transceiver. Specifically, the wireless communication module with no control over the single transceiver is not aware that the single transceiver is occupied by another wireless communication module, because the two or more wireless communication modules operate independently and lack a proper communication mechanism therebetween. For example, a dual-card cellular phone may be configured such that the single transceiver is occupied by the first wireless communication module for performing a PS data service, e.g. the Multimedia Messaging Service (MMS). While the dual-card cellular phone is performing the PS data service with the first wireless communication module, a second wireless communication module may constantly interrupt the PS data service in order to gain the control of the single transceiver for performing radio measurements which allows the second communication module to maintain mobility or receive network messages, such as a paging message. As a result, the PS data rate or data throughput of the PS data service would be damaged.

Therefore, it is desirable to have a flexible way of managing the operations between the multiple wireless communication modules for multiple subscriber identity cards, so that the operations of the multiple wireless communication modules may be coordinated to maximize or enhance the PS data rate while maintaining the mobility in the network for the idle subscriber cards.

BRIEF SUMMARY OF THE INVENTION

Accordingly, embodiments of the invention provide apparatuses and methods to enhance a data rate of a packet-switched (PS) data service. In one aspect of the invention, a wireless communication device for eliminating performance degradation of a packet-switched (PS) data service is provided. The device comprises a processor configured to receive a request to perform the PS data service with a first subscriber identity card, reduce a plurality of scheduled monitoring tasks associated with a second subscriber identity card, and perform the PS data service with the first subscriber identity card while using the reduced scheduled monitoring tasks to maintain mobility or receive network messages with the second subscriber identity card.

In another aspect of the invention, a wireless communication method for enhancing a data rate of a packet-switched (PS) data service is provided. The method comprises: receiving a request to perform the PS data service with a first subscriber identity card; reducing a plurality of scheduled monitoring tasks associated with a second subscriber identity card; and performing the PS data service with the first subscriber identity card while using the reduced scheduled monitoring tasks to maintain mobility or receive network messages with the second subscriber identity card.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. It should be understood that the embodiments may be realized in software, hardware, firmware, or any combination thereof.

Figure 1:
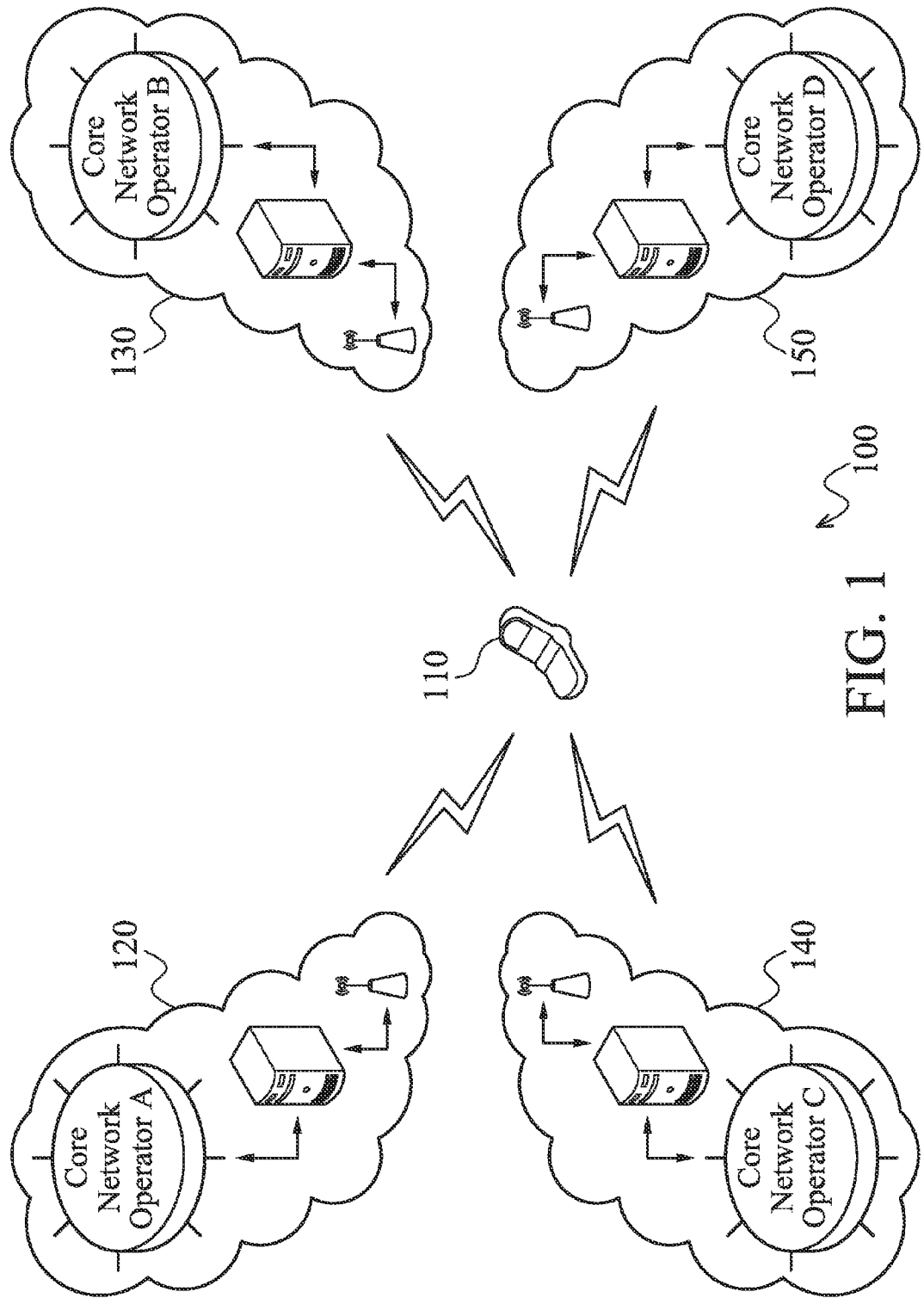
FIG. 1 is a block diagram of a wireless communications environment according to an embodiment of the invention.

FIG. 1 is a block diagram of a wireless communications environment according to an embodiment of the invention. The wireless communications environment 100 comprises a mobile station (MS) 110, and service networks 120, 130, 140 and 150. The MS 110 may be equipped with wireless communication modules and/or associated subscriber identity cards which enable the MS 110 to communicate with service networks with same or different technology (RAT). The MS 110 may wirelessly communicate with the service networks 120, 130, 140 and 150 with one to four separate subscriber numbers and/or four separate subscriber identities, after camping on one to four cells. The cell may be managed by a node-B, a base station (BS), an advanced BS (ABS), an enhanced BS (EBS) or others. The service networks 120, 130, 140 and 150 may be in compliance with any of the GSM/GPRS/EDGE, WCDMA, CDMA 2000, UMTS, TD-SCDMA, WiFi, WiMAX, LTE, LTE-A, and TD-LTE technologies. The subscriber numbers may be provided by up to four separate subscriber identity cards in compliance with the specifications of the technologies employed by the service networks 120, 130, 140 and 150, or, in the cases when technologies such as WiFi or WiMAX is employed, a subscriber identity card is not required, but the user is required to provide a dongle, or a user name and a password. For example, the service network 120 may be a GSM/GPRS/EDGE system, and correspondingly, one of the subscriber identity cards may be a Subscriber Identity Module (SIM) card, while the service network 130 may be a WCDMA, UMTS, LTE, or TD-LTE system and correspondingly, the other one of the subscriber identity cards may be a Universal SIM (USIM) card. The service network 140 may be a CDMA 2000 system and correspondingly, one of the subscriber identity cards may be a Removable User Identity Module (R-UIM) card, while the service network 150 may be a WiMAX system and correspondingly, the user is required to provide a dongle, or a user name and a password. The four subscriber identity cards equipped by the MS 110 may be taken as an example. The MS 110 may also be equipped with 2, 3, or more subscriber identity cards and be adapted to 2, 3, or more wireless telecommunication technologies according to different design requirements of the MS 110.

The MS 110 wirelessly accesses the Internet resources, such as e-mail transmissions, Web browsing, file upload/download, instant messaging, streaming videos, or others, or makes a wireless phone call, such as a voice over IP (VoIP) call, an IP Multimedia Subsystem (IMS) call, a CS call or others. In addition, a computer host or a notebook may connect/couple to the MS 110 and wirelessly access Internet resources therethrough. The MS 110 may be operated in an idle mode or dedicated mode in GSM systems for the inserted SIM card. In an idle mode, the MS searches for or measures a Broadcast Control Channel (BCCH) with a better signal quality from a cell provided by a specific service network, or is synchronized to the BCCH of a specific cell, wherein it is continuously ready to perform a random access procedure on a Random Access Channel (RACH) for requesting for a dedicated channel. In the dedicated mode, the MS 110 occupies a physical channel and tries to synchronize therewith, and establishes logical channels and performs switching therethrough. As the MS 110 is equipped with one or more SIM and/or USIM cards, the MS 110 may be operated in an idle mode and a connected mode, in the GSM/GPRS/EDGE, WCDMA, CDMA 2000, UMTS, TD-SCDMA, WiFi, WiMAX, LTE, LTE-A, and TD-LTE network, for each inserted SIM and/or USIM card.

The MS may perform power measurements to candidate cells (e.g. the serving cell and the neighbor cells) and use the measured signal quality and/or signal strength as an input for handover and cell reselection decisions. In the case where the MS is in the idle mode, the list of the neighboring GSM cell Broadcast Control Channel (BCCH) frequencies may be transmitted with its own BCCH frequency and the MS may listen for the BCCH frequencies and perform a power measurement for the GSM Received Signal Strength Indication (RSSI) of the BCCH, which is a wideband received power within the GSM channel bandwidth. In the case of a UMTS or WCDMA network, although the same wideband frequency is used by adjacent cells, the cells are physically identified by their different scrambling codes, and the MS may constantly monitor the Common Pilot Channel (CPICH) for power levels (e.g. Energy over Noise Ratio (Ec/No), Received Signal Code Power (RSCP), and so on). The information may then be used to assess whether the UMTS/WCDMA cell should be added to the active set for cell reselection. The MS may make a cell reselection decision depending on different cell reselection criteria corresponding to each radio access technology (RAT). For example, for a GSM network, the cell selection/reselection criteria may be based on the C1 and C2 criterions. Alternatively, for a UMTS network or a WCDMA network, there may be other cell selection/reselection criteria such as the S-criterion and the R-criterion. The MS may check for the Location Area Identity (LAI) from the system information message present on the BCCH, the broadcast channel (BCH), or others, after a cell reselection is performed, wherein the LAI represents a unique identity for different Location Areas (LAs). When the new cell and the old cell belong to different LAs, an LA update may be required.

LA update is a procedure that makes the network aware of the MS location. This is a prerequisite for mobility where the MS movement can be tracked and its position known in the case of incoming MT calls, MT short message services (MT SMS) or others. Generally, the wireless network architecture for any of the GSM/GPRS/EDGE, WCDMA, CDMA 2000, WiMAX, TD-SCDMA, LTE, LTE-A, TD-LTE, or other technologies embraces the challenge of supporting such functions as paging, location updating and connection handover/reselection. The handover/reselection mechanism guarantees that whenever the mobile station is moving from one base station area/cell to another, the radio connection is handed over or reselected to the target base station without interruption. The location update procedure, alternatively, enables the network of the supported RAT to keep track of the subscriber camping within the coverage of the network, while a paging message is used to reach the MS to which a call is destined (e.g. MT call, MT SMS or others). Each LA is uniquely identified with a Location Area Identity (LAI) and the LAI consists of a Mobile Country Code (MCC)+Mobile Network Code (MNC)+LA code (LAC).

Figure 2:
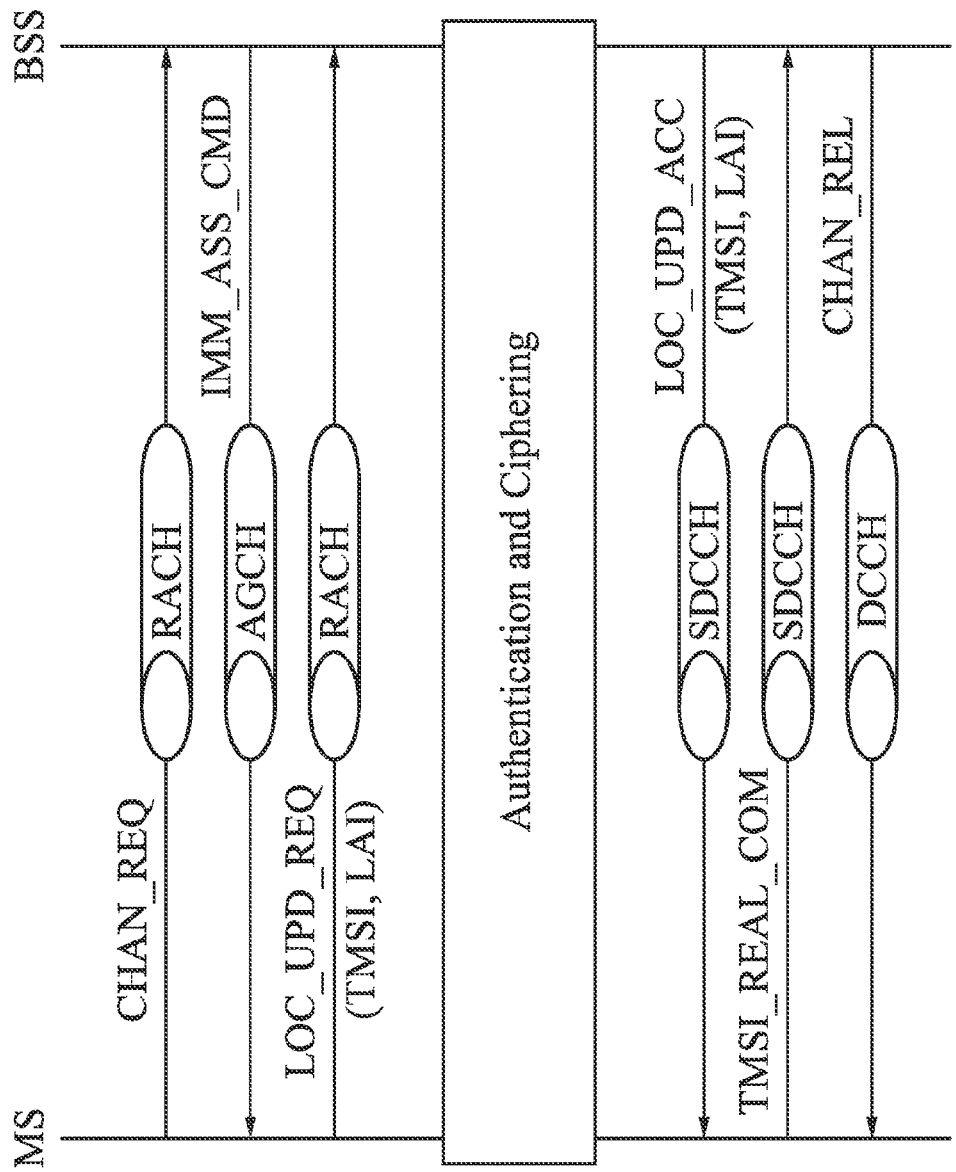
FIG. 2 is a diagram illustrating an exemplary LA update procedure for a GSM network.

FIG. 2 is a diagram illustrating an exemplary LA update procedure for a GSM network. In a GSM LA update procedure, the MS may firstly request for a channel by sending a Channel Request (CHAN_REQ) message on the RACH, and the BSS may respond by sending an Immediate Assignment Command message (IMM_ASS_CMD) on the AGCH. Then, the MS may switch to the assigned SDCCH and reply to the BSS with a Location Update Request (LOC_UPD_REQ). Included in the LOC_UPD_REQ is the TMSI that the MS is currently using as well as the Location Area Identifier (LAI) of the Visitor Location Register (VLR) it is leaving, and the BTS may acknowledge receipt of the message (not shown) to the BSS. An authentication procedure is then carried out. In the case where the authentication procedure is unsuccessful, the procedure is aborted. In the case where the authentication procedure is successful, the ciphering procedure is performed.

Before the network provides any services to the MS, the network requires the MS to authenticate itself. During the authentication and ciphering process, the BSS sends an Authentication Request (AUTH_REQ) message including a random number (RAND) to the MS, the RAND is 128-bit random challenge generated by the Home Location Register (HLR) for authentication. The MS calculates a proper signed response (SRES) based on the RAND that was given and sends the SRES to the BSS in an Authentication Response (AUTH_RESP) message. The BSS verifies the SRES, if the SRES is correct then the MS is authenticated and allowed to access the network. Once the MSC/VLR has authenticated the MS, the MSC/VLR may order the BSS and MS to switch to a cipher mode using the CIPH_MOD_CMD message. Once the MS in cipher mode, the VLR will normally assign a new TMSI to the MS. Once the MS is authenticated and in the cipher mode, the MSC/VLR may send a Location Update Accept message (LOC_UPD_ACC) through the BSS to the MS. The LOC_UPD_ACC may have a TMSI assignment in it. The MS may then respond to the BSS with a TMSI Reallocation Complete message (TMSI_REAL_COM) indicating that it has received the TMSI. The BSS then sends the MS a Channel Release message (CHAN_REL) instructing it to go into idle mode. The BSS then un-assigns the SDCCH. As far as the MS is concerned, the location update has been completed. The LA update procedure for the WCDMA, TD-SCDMA or UMTS systems is similar to that for the GSM systems and is omitted herein.

Figure 3:
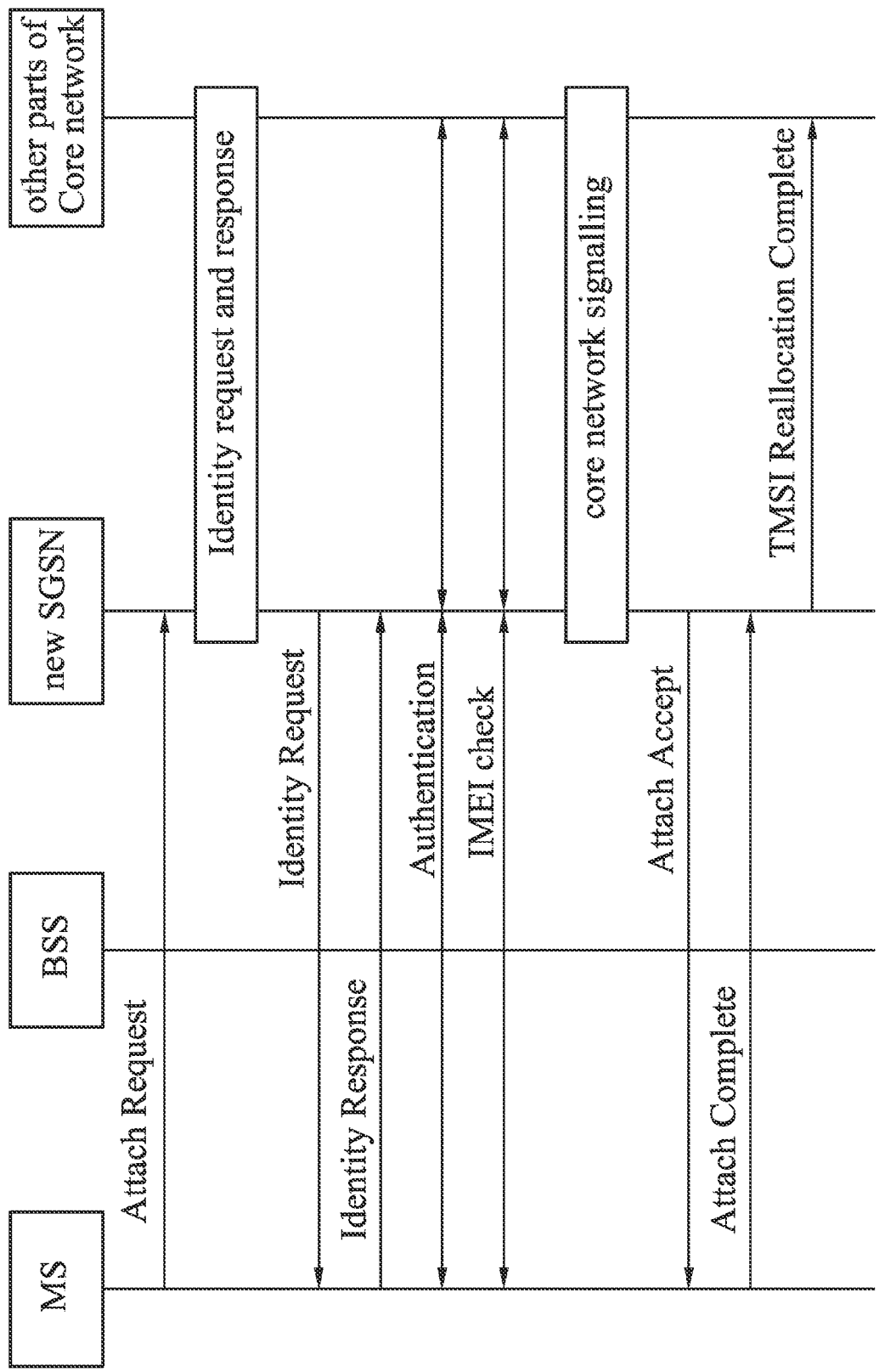
FIG. 3 is a simplified diagram illustrating a combined GPRS/IMSI attach procedure.

For the GPRS systems, networks based on the Internet Protocol (IP) (e.g. the global Internet or private/corporate intranets) and X.25 networks are supported. Before one of the (U)SIM cards of an MS can use the GPRS service, the MS needs to perform a GPRS attach procedure to attach to the GPRS network with one (U)SIM card. The GPRS attach procedure is a process during which the mobile device informs the network about its presence in the network. In a GPRS attach procedure, the SGSN establishes a mobility management (MM) context relating to the mobility and security for the MS. FIG. 3 is a simplified diagram illustrating a combined GPRS/IMSI attach procedure. In the combined GPRS/IMSI attach procedure, the MS first sends an Attach Request message to a Serving GPRS Support Node (SGSN), wherein the message sent to the new Serving GPRS Support Node (SGSN) contains the last assigned Packet Temporary Mobile Subscriber Id (P-TMSI) or IMSI, and the location area information, etc. The new SGSN then queries the old SGSN (the previous attached SGSN) for the identity of the MS by exchanging Identity Request and Identity Response messages. Then, the new SGSN requests more information from the MS to authenticate itself by exchanging Identity Request and Identity Response messages. After the MS identity is checked, an authentication similar to the one described in FIG. 2 is performed, the authentication procedure is mandatory if no mobility management (MM) context for the MS exists anywhere in the service network. After authentication, an optional International Mobile Equipment Identity number (IMEI) check may be performed to check the MS equipment. Then, core network signaling takes place, wherein any active PDP context in the new SGSN for the MS is deleted, and signaling exchange takes place between the new SGSN and the Home Location Register (HLR)/Visitor Location Register (VLR) to update the location of the MS. The SGSN selects a Radio Priority SMS, and sends an Attach Accept (which may include P-TMSI, VLR TMSI, P TMSI Signature, Radio Priority SMS, IMS voice over PS Session Supported Indication, or Emergency Service Support indicator) message to the MS. Then, if the P-TMSI or VLR TMSI has been changed, the MS acknowledges the received TMSI(s) by returning an Attach Complete message to the SGSN, and the SGSN confirms the VLR TMSI re-allocation by sending a TMSI Reallocation Complete message to the VLR.

Figure 4:
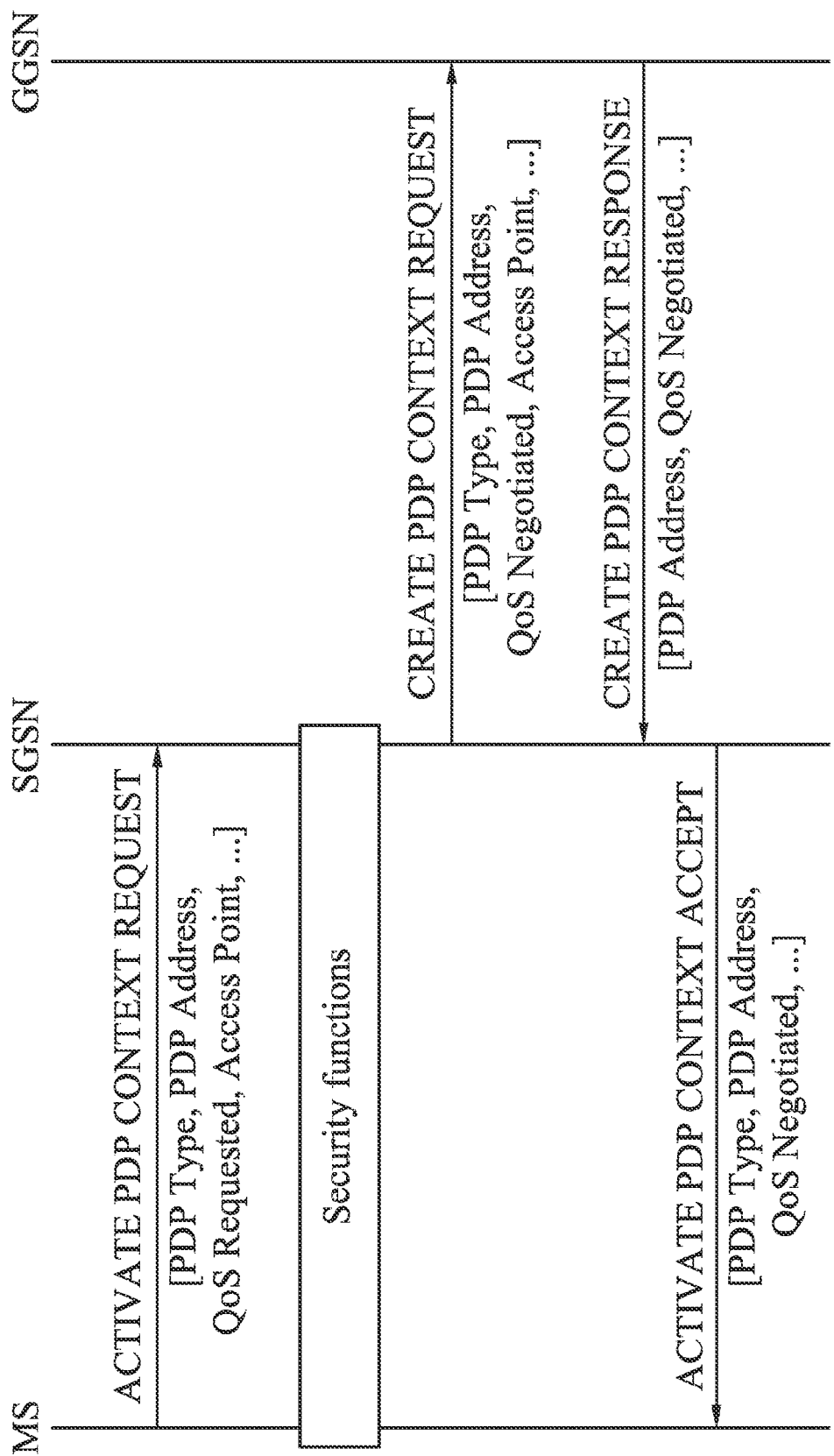
FIG. 4 is a diagram illustrating the PDP context activation procedure initialized by an MS.

To exchange data packets with external Public Data Networks (PDNs) after a successful GPRS attach procedure, the MS applies for an address used in the PDN, wherein the address is called a Packet Data Protocol (PDP) address. In the case where the PDN is an IP network, the PDP address is an IP address. For each session, a so-called PDP context is created, which describes the characteristics of the session. The PDP context describes PDP types (e.g. IPv4, IPv6 or others), wherein the PDP address is assigned to the MS, the requested Quality of Service (QoS) class and the address of a Gateway GPRS Support Node (GGSN) that serves as the access point to the external network. FIG. 4 is a diagram illustrating the PDP context activation procedure initialized by an MS. With the ACTIVATE PDP CONTEXT REQUEST message, the MS informs the SGSN of the requested PDP context. After that, the typical GSM security functions (e.g. authentication of the MS) are performed. If the access is granted, the SGSN will send a CREATE PDP CONTEXT REQUEST message to the affected GGSN. The GGSN creates a new entry in its PDP context table, which enables the GGSN to route data packets between the SGSN and the external PDN. Next, the GGSN confirms the request to the SGSN with a CREATE PDP CONTEXT RESPONSE message. Finally, the SGSN updates its PDP context table and confirms the activation of the new PDP context to the MS with an ACTIVATE PDP CONTEXT ACCEPT message. Note that for an MS using both CS and PS services, it is possible to perform a combined GPRS/IMSI attach procedure (as illustrated in FIG. 3). The disconnection from the GPRS network is called GPRS detachment, which may be initiated by the MS or by the GPRS network.

In addition, IP packets are transmitted by being encapsulated within the GPRS backbone network. The IP packet transmission is achieved using the GPRS Tunneling Protocol (GTP). That is, GTP packets carry the user's IP packets. The GTP is defined both between GPRS Supports Nodes (GSNs) within the same PLMN and between GSNs of different PLMNs. The GTP contains procedures in the transmission plane as well as in the signaling plane. In the transmission plane, the GTP employs a tunnel mechanism to transfer user data packets. In the signaling plane, the GTP specifies a tunnel control and management protocol. The signaling is used to create, modify, and delete tunnels. A Tunnel Identifier (TID), which is composed of the IMSI of the (U)SIM card and a Network Layer Service Access Point Identifier (NSAPI) uniquely indicates a PDP context. Below the GTP, a transmission control protocol (TCP) is employed to transport the GTP packets within the backbone network. In the network layer, IP is employed to route the packets through the backbone. Taking the GSM systems for example, after the MS successfully attaches to a GPRS network with a (U)SIM card, a cell supporting GPRS may allocate physical channels for the GPRS traffic. In other words, the radio resources of a cell are shared by the MS with the (U)SIM card.

An MS carries out the process of a Public Land Mobile Network (PLMN) search procedure each time the MS is switched on or when the MS is recovering from a state of lack of coverage (e.g. a limited service state). The PLMN search procedure is the process of selecting the best PLMN available. If it is in the home PLMN service area, the MS is programmed to select the home PLMN irrespective of whether other PLMNs are the better choice, wherein the home PLMN is a PLMN where the Mobile Country Code (MCC) and the Mobile Network Code (MNC) of the PLMN identity match the MCC and MNC of the International Mobile Subscriber Identity (IMSI) of the SIM card inside of the MS. If the home PLMN is not found, another PLMN from a priority list is selected and a cell belonging to that PLMN is searched.

The MS looks for a suitable cell of the chosen PLMN and chooses that cell to provide available services, and tunes to its control channel. This choosing is known as a "cell selection" or "camping on the cell". The MS will then register its presence in the registration area of the chosen cell if necessary, by means of a location registration (LR), GPRS attach or IMSI attach procedure (as described in FIG. 3). Initial cell selection is the process of the MS finding the best possible cell on a newly selected PLMN in order to receive the system information on the BCCH from the selected PLMN, initiate/receive a call, or receive cell broadcast messages. Two methods of searching for a suitable cell are possible, namely the normal cell selection method and the stored list cell selection method. In the normal cell selection method, the MS looks for a cell which satisfies 5 constraints for a suitable cell by checking cells in descending order of received signal strength. Specifically, these 5 constraints are listed as the following:

The suitable cell should be a cell of the selected PLMN or, if the selected PLMN is equal to the last registered PLMN, an equivalent PLMN.

The suitable cell should not be "barred".

The suitable cell should not be in an LA which is in the list of "forbidden LAs for roaming"

The radio path loss between the MS and base station must be below a threshold set by the PLMN operator.

The suitable cell should not be a Support of Localised Service Area (SoLSA) exclusive cell to which MS does not subscribe.

The MS may perform a PLMN search procedure to camp on a suitable cell. During the PLMN search procedure, the MS may perform a power scan to find out proper cells to camp on. For the GSM technology, during the power scan, the processor in the GSM/GPRS Baseband chip may instruct the GSM/GPRS RF module to perform signal level measurements on frequencies of the current network. After finding potential candidates based on the received signal level RXL-REV (that is, completion of the power scan), each carrier is investigated by the processor in the GSM/GPRS Baseband chip for the presence of a frequency correction channel (FCCH), beginning with the strongest signal. A FCCH burst (FCB) is an all-zero sequence that produces a fixed tone enabling the GSM/GPRS RF module to lock its local oscillator to the base station clock. Its presence identifies the carrier as a BCCH carrier for synchronization. The MS then uses a synchronization burst (SB) of the synchronization channel (SCH) following the FCCH burst and has a long training sequence to fine tune the frequency correction and time synchronization. The processor in the GSM/GPRS Baseband chip obtains and stores the exact channel configuration of the selected cell from the BCCH data as well as the frequencies of the neighboring cells. After completely collecting and storing information regarding the exact channel configuration and neighboring cells in memory or a storage device, the GSM/GPRS module performs a location update procedure through a traffic channel (TCH) to inform the cellular network of its location. After the PLMN search procedure is completed, the MS may perform normal circuit switched (CS) or PS operations with the service network it is subscribed to.

Figure 5:
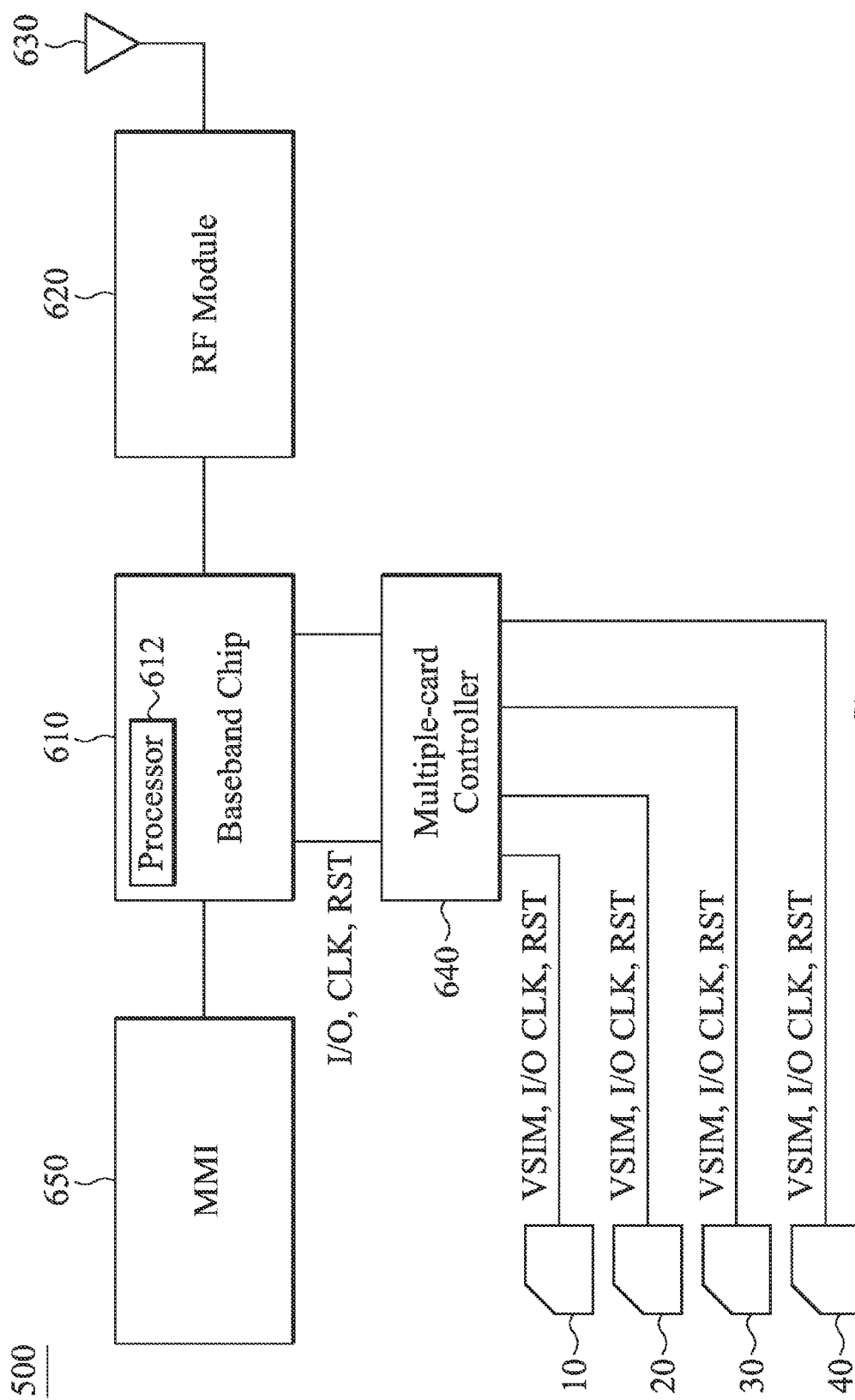
FIG. 5 is a block diagram illustrating the hardware architecture of an MS 500 according to an embodiment of the invention.

FIG. 5 is a block diagram illustrating the hardware architecture of an MS 500 according to an embodiment of the invention. The MS 500 is equipped with a baseband chip 610, and a single RF module 620 coupled with an antenna 630. The baseband chip 610 may contain multiple hardware devices to perform baseband signal processing, including analog to digital conversion (ADC)/digital to analog conversion (DAC), gain adjusting, modulation/demodulation, encoding/ decoding, and so on. In particular, the baseband chip 610 may comprise a processor 612. In an embodiment, the processor 612 may be configured to execute instructions stored in a memory device of the MS 500 or otherwise accessible to the processor 612. By executing stored instructions or operating in accordance with hard coded instructions, the processor 612 may control the operation of the MS 500 by directing functionality of the MS 500 associated with enhancing the data rate for a PS data service. The processor 612 may also be configured to coordinate operations between different modules of the MS 500, such as the MMI 650, the RF module 620, and the subscriber identity cards 10, 20, 30 and 40. The RF module 620 may receive RF wireless signals from the antenna 630, convert the received RF wireless signals to baseband signals, which are then processed by the baseband chip 610, or receive baseband signals from the baseband chip 610 and convert the received baseband signals to RF wireless signals, which are later transmitted via the antenna 630. The RF module 220 may also contain multiple hardware devices to perform radio frequency conversions. For example, the RF module 220 may comprise a mixer to multiply the baseband signals with a carrier oscillated in the radio frequency of the wireless communications system, wherein the radio frequency may be 900 MHz, 1800 MHz or 1900 MHz utilized in GSM systems, or may be 900 MHz, 1900 MHz or 2100 MHz utilized in UMTS and WCDMA systems, or others depending on the radio access technology (RAT) in use. As shown in FIG. 5, the subscriber identity cards 10, 20, 30 and 40 are plugged into four sockets of the MS 500. The MS 500 may further comprise a multiple-card controller 640 coupled or connected between the baseband chip 610 and the subscriber identity cards 10, 20, 30 and 40. The multiple-card controller 640 powers the subscriber identity cards 10, 20, 30 and 40 with the same or different voltage levels according to requirements thereof by a power management integrated chip (PMIC) and a battery, wherein the voltage level for each subscriber identity card is determined during initiation. The baseband chip 610 reads data from one of the subscriber identity cards 10, 20, and 40, and writes data to one of the subscriber identity cards 10, 20, 30 and 40 via the multiple-card controller 640. In addition, the multiple-card controller 640 selectively transfers clocks (CLK), resets (RST), and/or input/output data signals (I/O) to the subscriber identity cards 10, 20, 30 and 40 according to instructions issued by the baseband chip 610. The baseband chip 610 may support one or more of the GSM/GPRS/EDGE, UMTS, WCDMA, CDMA 2000, WiMAX, TD-SCDMA, LTE, and TD-LTE technologies. The subscriber identity cards 10, 20, 30 and 40 may be any of the Subscriber Identity Module (SIM) cards, Universal SIM (USIM) cards, Removable User Identity Module (R-UIM), and CDMA Subscriber Identity Module (CSIM) cards, which correspond to the wireless communications technologies supported by the baseband chip 610. In the case when no subscriber identity card is required for a particular RAT, such as the WiFi or the WiMAX technology, the MS 500 may prompt the user for a user name and password through the MMI 650. The MMI 650 may include a keyboard, a touch panel, a touch screen, a joystick, a mouse and/or a scanner, and so on. The MS 500 may therefore simultaneously camp on as many cells provided by either the same network operator or different network operators for the plugged subscriber identity cards 10, 20, 30 and 40, and operate in different modes such as connected mode, idle mode, cell Dedicated Channel (CELL_DCH) mode, cell Forward access channel (CELL_FACH) mode, cell Paging Channel (CELL_PCH) mode and UTRAN Registration Area Paging Channel (URA_PCH) mode using the single RF module 620 and the baseband chip 610.

Figure 6:
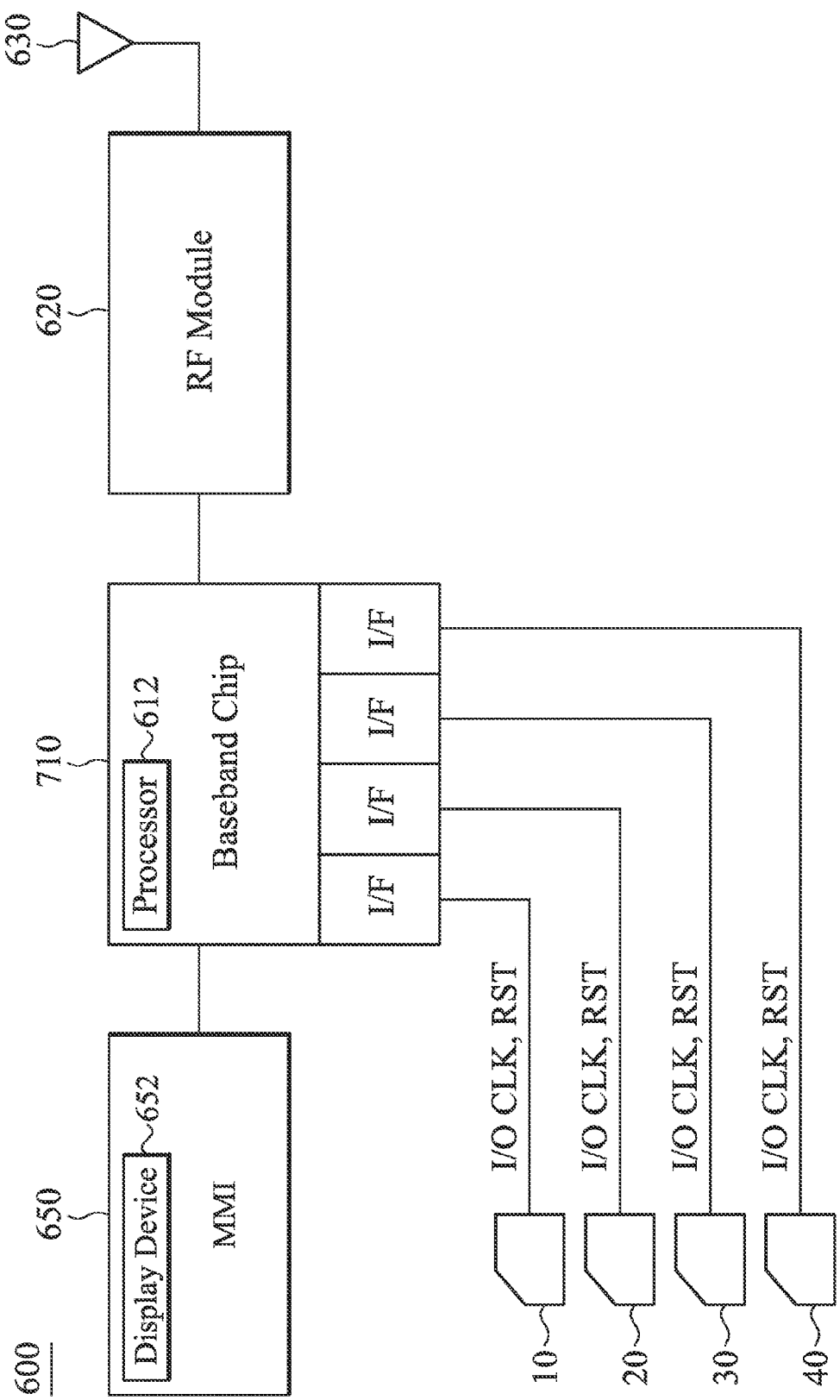
FIG. 6 is a block diagram illustrating the hardware architecture of an MS 600 according to another embodiment of the invention.

Alternatively, FIG. 6 is a block diagram illustrating the hardware architecture of an MS 600 according to another embodiment of the invention. Similar to FIG. 5, the baseband chip 710 performs baseband signaling processing, such as ADC/DAC, gain adjusting, modulation/demodulation, encoding/decoding, and so on. The baseband chip 710 may also comprise a processor 712, which controls the operation of the MS 600 by directing functionality of the MS 600 associated with managing the selection of a service network from multiple service networks to perform an operation. And similarly, the MS 600 may also include a MMI 650. However, the connections from the MS 600 to the subscriber identity cards 10, 20, 30 and 40 are independently handled by four interfaces (I/F) provided from the baseband chip 710. Similarly, in the case where no subscriber identity cards is required for a particular RAT, such as the WiFi or the WiMAX technology, the MS 600 may prompt the user for a user name and password through the MMI 650, or a dongle may be required for connection to the MS 600. It is to be understood that the hardware architecture as shown in FIG. 5 or 6 may be modified to include less than four or more than four subscriber identity cards, and the invention is not limited thereto.

Figure 7:
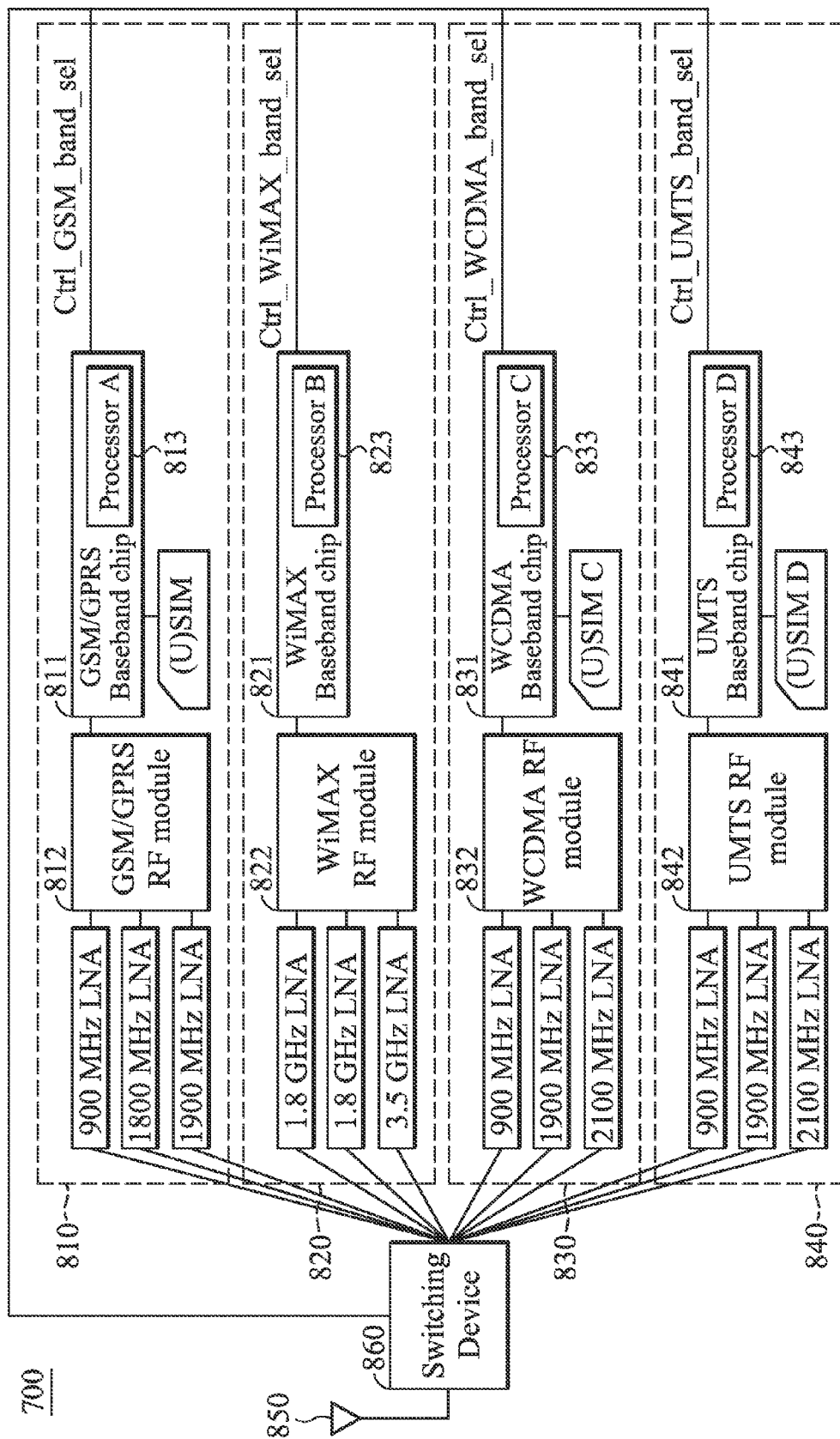
FIG. 7 is a block diagram illustrating the hardware architecture of an MS 700 coupled with four subscriber identity cards and a single antenna according to an embodiment of the invention.

FIG. 7 is a block diagram illustrating the hardware architecture of an MS 700 coupled with four subscriber identity cards and a single antenna according to an embodiment of the invention. The exemplary hardware architecture may be applied to any MS utilizing GSM/GPRS/EDGE, WCDMA, CDMA 2000, UMTS, TD-SCDMA, WiFi, WiMAX, LTE, LTE-A, or TD-LTE technologies. In the exemplary hardware architecture, four Radio Access Technology (RAT) modules, the GSM/GPRS module A 810, the WiMAX module 820, the WCDMA module B 830 and the UMTS module B 840 may share a single antenna 850, and each RAT module contains at least an RF module and a baseband chip, to camp on a cell and operate in a stand-by mode, idle mode, connected mode, CELL_DCH mode, CELL_FACH mode, CELL_PCH mode, URA_PCH mode, and so on. As shown in FIG. 7, the GSM/GPRS baseband chip A 811 is coupled to a GSM/GPRS RF module A 812, the WiMAX baseband chip 821 is coupled to a WiMAX RF module 822, the WCDMA baseband chip 831 is coupled to a WCDMA RF module A 832, and the UMTS baseband chip 841 is coupled to a UMTS RF module 842. Each baseband chip includes a processor, e.g. the GSM/GPRS baseband chip A 811 includes a processor A 813, the WiMAX baseband chip 821 includes a processor B 823, the WCDMA baseband chip 831 includes a processor C 833, and the UMTS baseband chip 841 includes a processor D 843. In addition, when operating in a specific mode, each RAT module may interact with a specific subscriber identity card as required, such as a (U)SIM A, B, or D (note: no specific subscriber identity card is required when using a WiMAX network or a WiFi network). A switching device 860 is coupled between the shared antenna 850, the MMI 650, and multiple Low Noise Amplifiers (LNAs). The switching device 860 may connect the antenna 850 to one LNA to allow the RF signals to pass through the connected LNA. Each LNA amplifies signals in a 2G/3G/4G band received by the shared antenna 850 and provides the signals to a corresponding RF module 812/822/832/842, wherein the 2G/3G/4G band may be a 900 MHz, 1800 MHz, 1900 MHz, or 2100 MHz band, or others. Once one of the baseband chips 811/821/831/841 attempts to perform a transceiving activity, such as a transmission (TX) or a reception (RX) activity, it issues a control signal Ctrl_GSM_band_sel, Ctrl_WiMAX_band_sel, Ctrl_UMTS_bands_sel or Ctrl_WCDMA_band_sel to direct the switching device 860 to connect the shared antenna 850 to a designated LNA. Similarly, each processor 813/823/833/843 may also control the operation associated with managing the selection of a service network from multiple service networks to perform an operation by issuing the control signals of Ctrl_GSM_band_sel, Ctrl_WiMAX_band_sel, Ctrl_UMTS_ band_sel or Ctrl_WCDMA_band_sel. It is to be understood that the GSM/GPRS module A 810, the WiMAX module 820, the WCDMA module B 830 and the UMTS module B 840 are given as examples. For those skilled in the art, any of the GSM/GPRS/EDGE, WCDMA, CDMA 2000, WiMAX, TD-SCDMA, LTE, LTE-A, TD-LTE, or other technologies may be used to implement the RAT modules 810, 820, 830 and 840 in the hardware architecture without departing from the spirit of the invention, and the invention is not limited thereto. It is to be understood that the hardware architecture as shown in FIG. 7 may be modified to include less or more subscriber identity cards and/or RF modules relating to different RATs, and the invention is not limited thereto.

A SIM card typically contains user account information, an international mobile subscriber identity (IMSI), and a set of SIM application toolkit (SAT) commands. In addition, storage space for phone book contacts is provided in SIM cards. A micro-processing unit (MCU) of a baseband chip (referred to as a Baseband MCU hereinafter) may interact with the MCU of a SIM card (referred to as a SIM MCU hereinafter) to fetch data or SAT commands from the plugged SIM card. An MS is immediately programmed after the SIM card is plugged in. SIM cards may also be programmed to display custom menus for personalized services. A SIM card may further store a Home Public-Land-Mobile-Network (HPLMN) code to indicate an associated network operator, wherein the HPLMN code contains a Mobile Country Code (MCC) followed by a Mobile Network code. To further clarify, an IMSI is a unique number associated with a global system for mobile communication (GSM) or a universal mobile telecommunications system (UMTS) network user. An IMSI may be sent by an MS to a GSM or UMTS network to acquire other detailed information of the network user in the Home Location Register (HLR) or to acquire the locally copied detailed information of the network user in the Visitor Location Register (VLR). Typically, an IMSI is 15 digits long or shorter (for example, the MTN South Africa's IMSIs are 14 digits long). The first 3 digits are the Mobile Country Code (MCC), and are followed by the Mobile Network Code (MNC), either 2 digits (European standard) or 3 digits (North American standard). The remaining digits are the mobile subscriber identification numbers (MSIN) for a GSM or UMTS network user.

A USIM card is inserted in an MS for UMTS (also called 3G) telephony communication. A USIM card stores user account information, IMSI information, authentication information and a set of USIM Application Toolkit (USAT) commands therein, and provides storage space for text messages and phone book contacts. A USIM card may further store a Home Public-Land-Mobile-Network (HPLMN) code therein to indicate an associated network operator. A Baseband MCU may interact with an MCU of a USIM card (referred to as a USIM MCU hereinafter) to fetch data or USAT commands from the plugged in USIM card. Note that the phone book on the USIM card has been greatly enhanced from that of the SIM card. For authentication purposes, the USIM card may store a long-term preshared secret key K, which is shared with the Authentication Center (AuC) in the network. The USIM MCU may verify a sequence number that must be within a range using a window mechanism to avoid replay attacks, and is in charge of generating the session keys CK and IK to be used in the confidentiality and integrity algorithms of the KASUMI (also termed A5/3) block cipher in UMTS. An MS is immediately programmed after plugging in the USIM card. In addition, an R-UIM or CSIM card is developed for a CDMA MS that is equivalent to the GSM SIM and 3G USIM, except that it is capable of working in CDMA networks. The R-UIM or CSIM card is physically compatible with the GSM SIM card, and provides a similar security mechanism for CDMA networks and network users.

Figure 8:
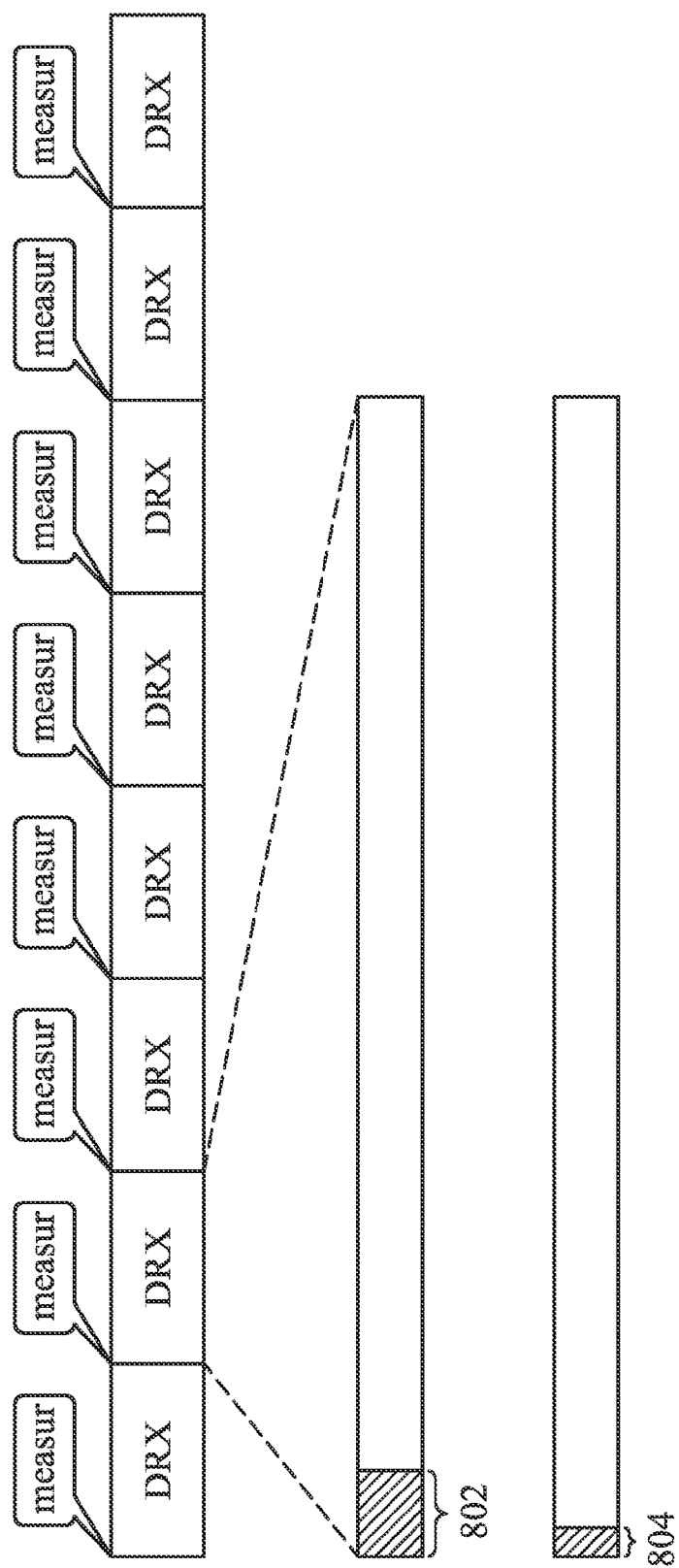
FIG. 8 is a diagram illustrating the DRX cycle for an MS.

When the MS is in a discontinuous reception (DRX) mode, several non-essential segments of the phone circuitry (e.g. the radio receiver) are powered down during periods which the MS does not expect to listen for paging messages or perform scheduled monitoring tasks (e.g. to Broadcast Control Channel (BCCH), Base Station Identity Code (BSIC) and/or common pilot channel (CPICH)). The DRX mode helps the MS to reduce power consumption, which extends the battery life. The MS may be required to listen for paging messages or perform scheduled monitoring tasks once every DRX cycle, and evaluate the cell selection/reselection criteria once every DRX cycle. Specifically, the DRX cycle is the individual time interval between listening for paging messages or performing scheduled monitoring tasks for a specific MS. FIG. 8 is a diagram illustrating the DRX cycle for an MS. As illustrated in FIG. 8, the MS may listen for paging messages and/or perform scheduled monitoring tasks at least once per DRX cycle. The MS may also evaluate the cell selection/reselection criteria once every DRX cycle, since a new measurement may be made to a serving cell and the neighbor cells at least every DRX cycle. The MS may perform the intra-frequency measurement 804 and/or the inter-frequency measurement 802 to the serving cell and/or neighbor cells, wherein the intra-frequency measurement 804 represents the measurements made for the neighbor cells with the same frequency as the serving cell, and the inter-frequency measurement 802 represents the measurements made for the neighbor cells with different frequencies as the serving cell. As shown in FIG. 8, the amount of time taken for the MS to perform the inter-frequency measurement 802 may be longer than the amount of time taken for the MS to perform the intra-frequency measurement 804. As such, when the MS is performing a PS data service with a second subscriber identity card while performing scheduled monitoring tasks (e.g. the inter-frequency measurements 802 and the intra-frequency measurement 804) with the first subscriber identity card, the inter-frequency measurements 802 may cause more damage to the PS data rate for the second subscriber identity card compared to the intra-frequency measurement 804.

Figure 9:
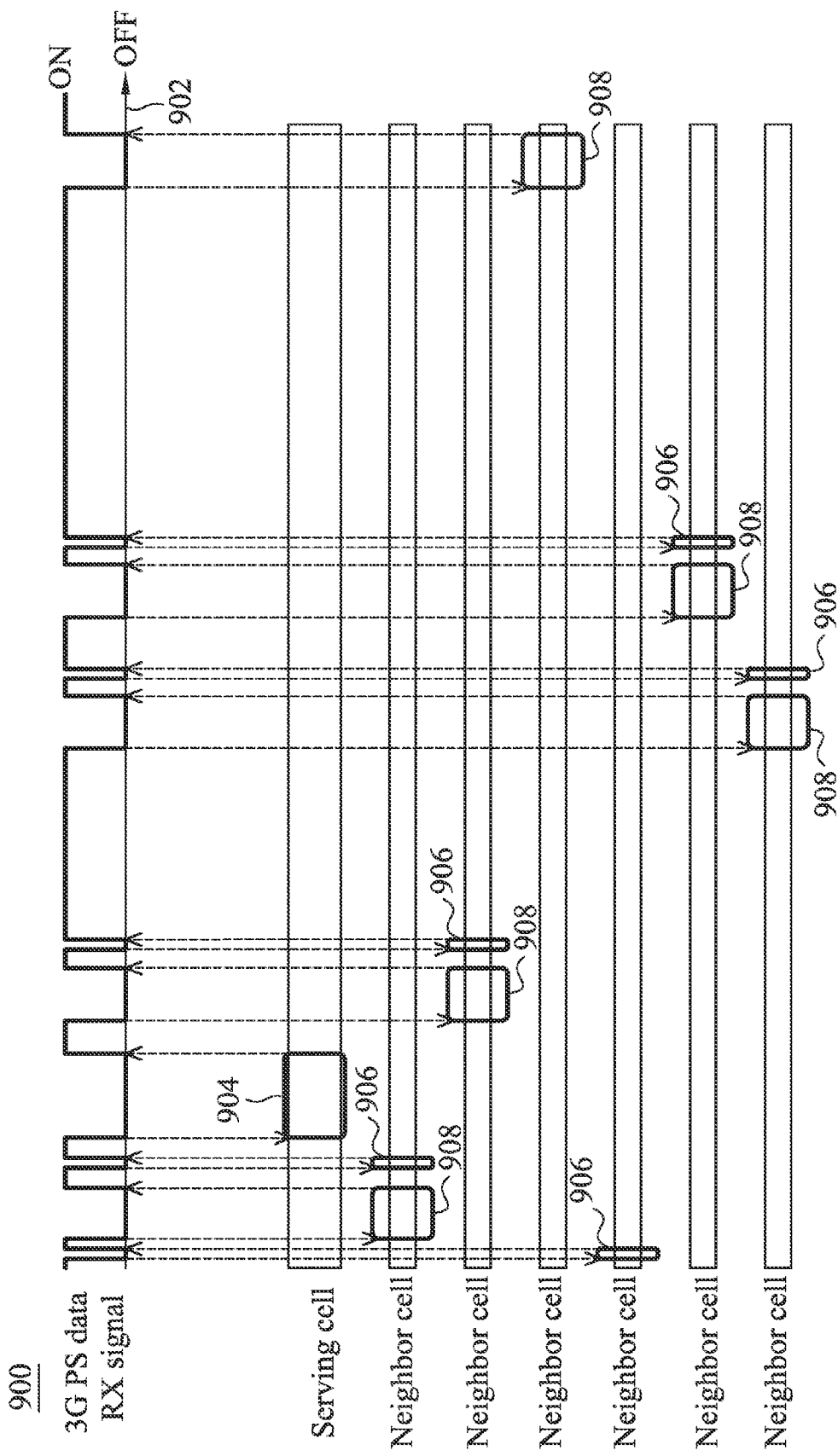
FIG. 9 is a diagram illustrating channel occupancy time for an MS that monitors a 2G CS paging channel and makes 2G power measurements in a 3G packet transfer mode according to an embodiment of the invention.

FIG. 9 is a diagram illustrating channel occupancy time for an MS that monitors a 2G CS paging channel and makes 2G power measurements in a 3G packet transfer mode according to an embodiment of the invention. In one embodiment, the MS may be receiving a 3G PS data RX signal 902 associated with a second subscriber identity card while listening for 2G paging messages or performing 2G scheduled monitoring tasks associated with a first subscriber identity card. As shown in FIG. 9, the 3G PS data RX signal 902 is interrupted when the MS performs the 2G CS paging channel monitoring 904, the BCCH decoding 906 and/or the BSIC decoding 908 with the 2G serving cell and/or 6 other 2G neighbor cells, causing a certain level of performance degradation, such as data throughput reduction, disconnecting from the 3G network, or others. For the GSM system, the MS may monitor up to six 2G neighbor cells. As shown in FIG. 9, when the MS performs the 2G CS paging channel monitoring 904, the BCCH decoding 906 or the BSIC decoding 908, the single radio resource hardware such as a single antenna or single RF module may be used for the scheduled 2G measurements such that the 3G PS data RX signal 902 may be interrupted, thus the data rate for the PS data service may be damaged. Alternatively, when the MS may also receive a PS data RX signal (2G, 3G or 4G) associated with the second subscriber identity card while listening for 3G paging messages or performing 3G scheduled monitoring tasks associated with a first subscriber identity card. The MS may listen for 3G paging messages by listening to the associated paging indicator (PI) messages which are transmitted in the Paging Indicator Channel (PICH) in the paging occasion at each DRX cycle, and listen to the PCH in an associated Secondary Common Control Physical Channel (S-CCPCH) for paging messages when the PICH carries a PI message intended for the MS. For performing 3G scheduled monitoring tasks, the MS may monitor the Common Pilot Channel (CPICH) for power levels (e.g. Energy over Noise Ratio (Ec/No), Received Signal Code Power (RSCP), and so on) of the serving cell and neighbor cells.

Figure 10:
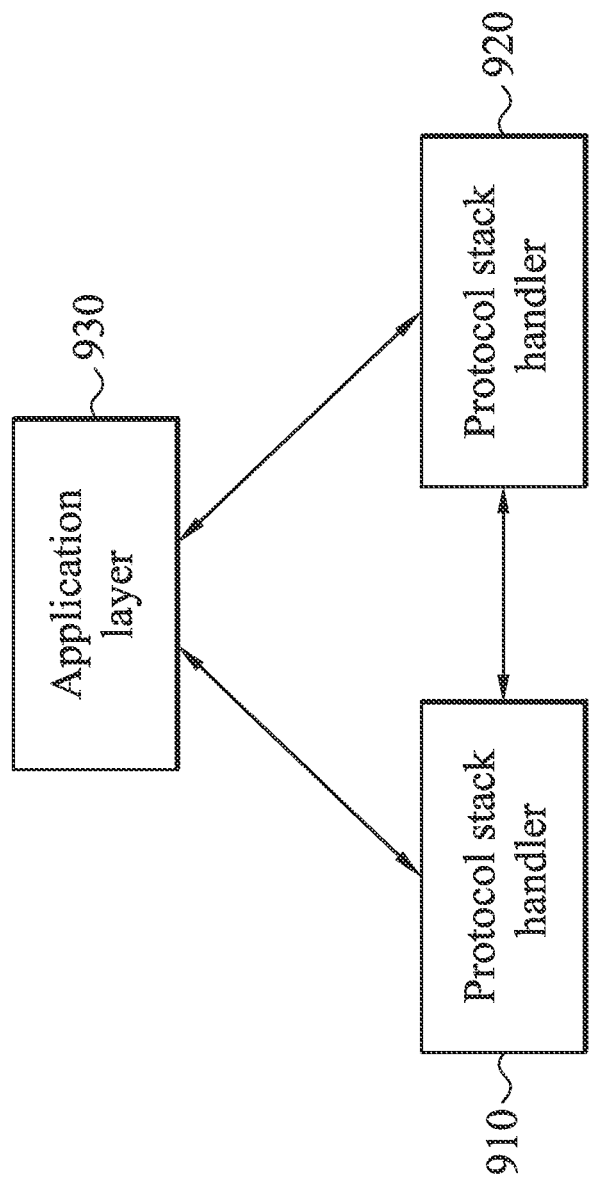
FIG. 10 is a block diagram illustrating the software architecture of an MS according to an embodiment of the invention.

FIG. 10 is a block diagram illustrating the software architecture of an MS according to an embodiment of the invention. The exemplary software architecture may contain the protocol stack handlers 910 and 920, and an application layer 930. The protocol stack handler 910, when executed by a processing unit or a Baseband MCU, is configured to communicate with a first service network (e.g. the service network 120) with a first subscriber identity card (e.g. the subscriber identity card 10), while the protocol stack handler 920, when executed by a processing unit or a Baseband MCU, is configured to communicate with a second service network (e.g. the service network 150) with a second subscriber identity card (e.g. the subscriber identity card 40). Or in an alternative case, the protocol stack handler 910 may be configured to communicate with a first service network (e.g. the service network 140) with a first subscriber identity card (e.g. the subscriber identity card 30), while the protocol stack handler 920 is configured to communicate with a second service network (e.g. the service network 130) with a second subscriber identity card (e.g. the subscriber identity card 20). The application layer 930 may contain program logics for providing Man-Machine Interface (MMI). The MMI is the means by which people interact with the MS, and the MMI may contain screen menus and icons, keyboard, shortcuts, command language, and online help, as well as physical input devices, such as buttons, touch screen, and keypad. By the input devices of the MMI, users may manually touch, press, click, or move the input devices to operate the MS for making or answering a phone call, texting, sending, or viewing short messages, multimedia messages, e-mails or instant messages, surfing the Internet, or others. Specifically, the application layer 930 may contain a web browser facilitating a user to browse the Internet, a streaming video player facilitating a user to watch streaming videos online, an e-mail client facilitating a user to edit, browse, or send e-mail messages, and/or a data call agent facilitating a user to initiate or receive a data call. When the protocol stack handler 920 is performing a packet-switched (PS) data service on-line, the protocol stack handler 910 may constantly listen to the paging channel for paging messages sent from the first service network. In an embodiment, the protocol stack handler 910 may listen to the paging channel (PCH) for paging messages within an associated Discontinuous Reception (DRX) cycle or an associated paging group signaled by higher layer when the associated first service network is a GSM network. In another embodiment, when the associated first service network is a WCDMA or UMTS network, the protocol stack handler 910 may listen to the associated paging indicator (PI) messages which are transmitted in the Paging Indicator Channel (PICH) in the paging occasion at each DRX cycle, and listen to the PCH in an associated Secondary Common Control Physical Channel (S-CCPCH) for paging messages when the PICH carries a PI message intended for the MS.

Figure 11:
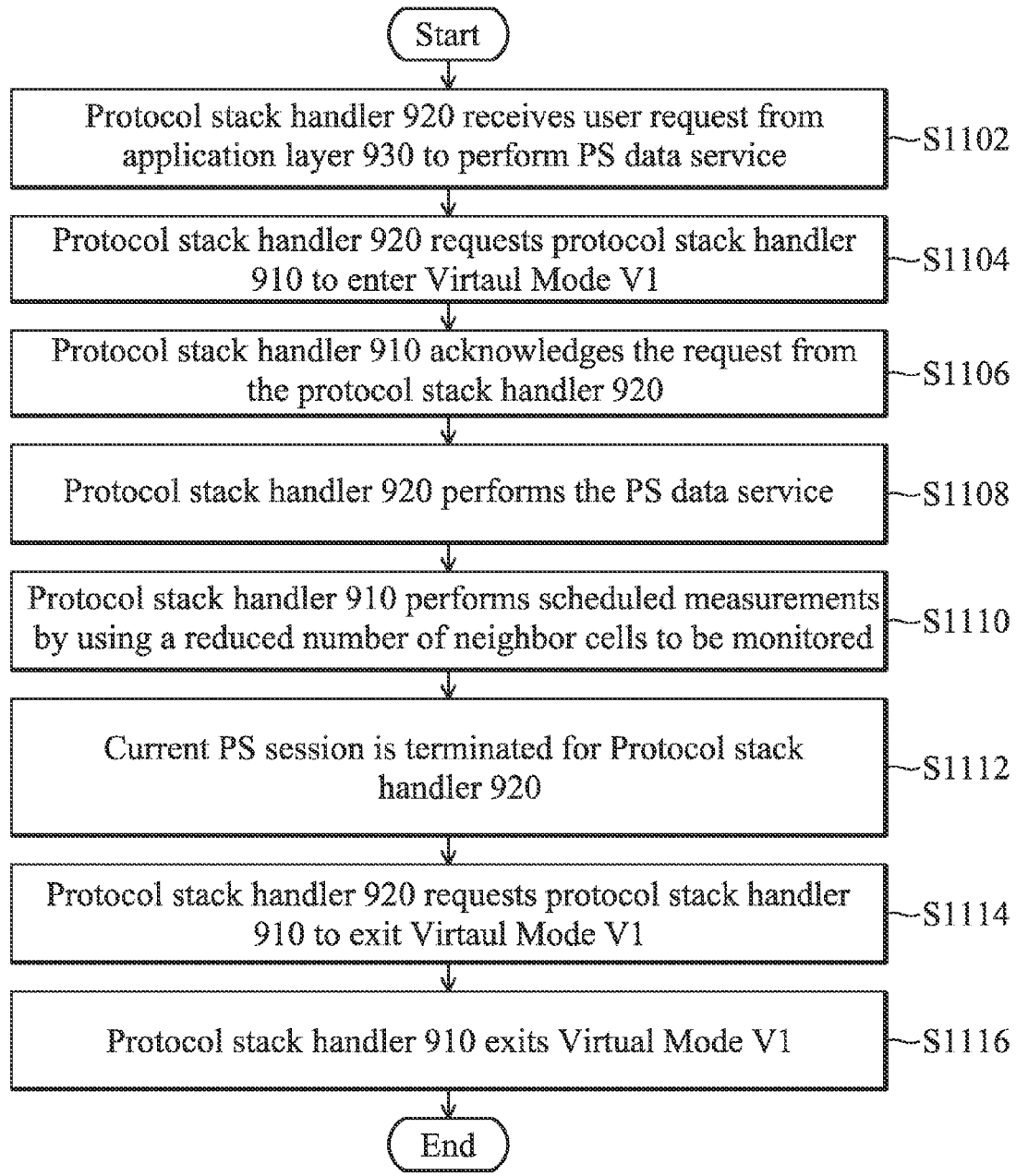
FIG. 11 is a flow chart illustrating a method for enhancing the data rate for a packet-switched (PS) data service by using the software architecture of FIG. 10 according to an embodiment of the invention.
Figure 12:
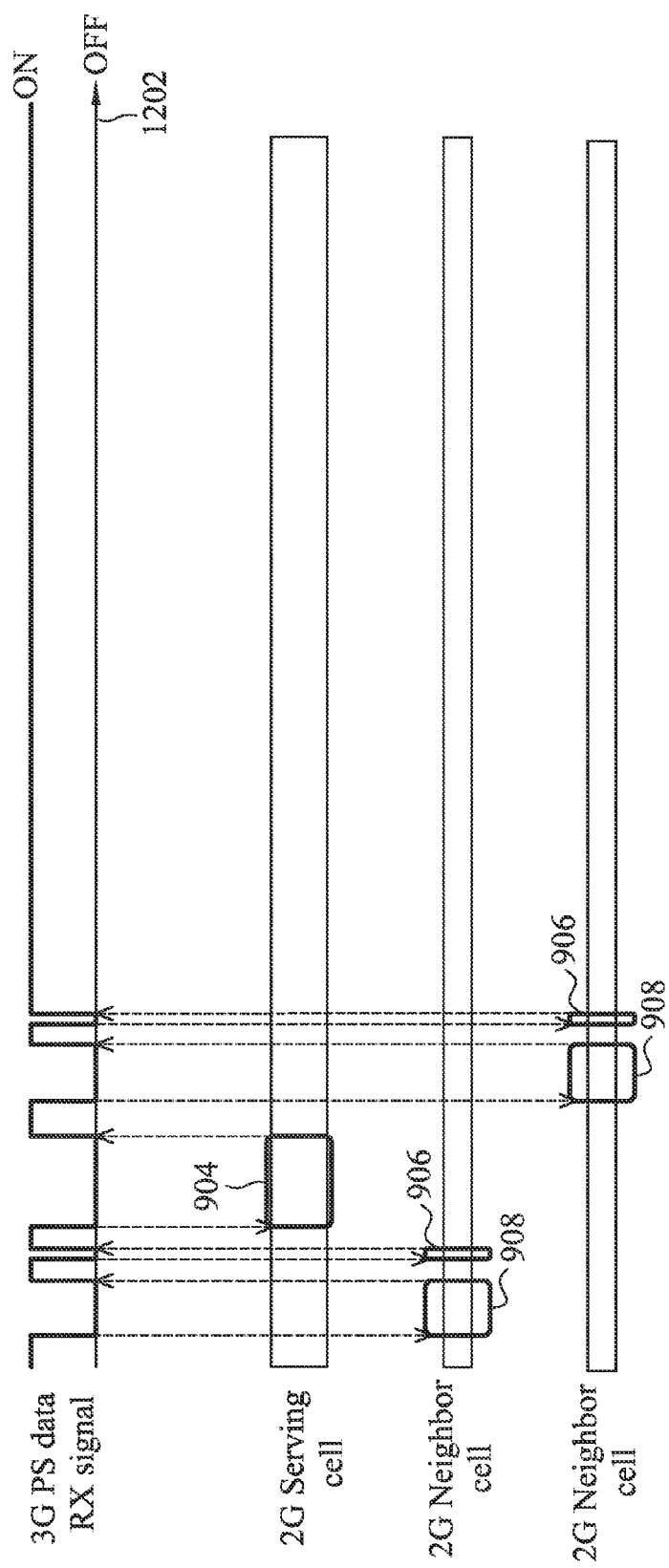
FIG. 12 is a diagram illustrating the channel occupancy time for an MS in the Virtual Mode V1 according to an embodiment of the invention.

FIG. 11 is a flow chart illustrating a method for eliminating performance degradation for a packet-switched (PS) data service by using the software architecture of FIG. 10 according to an embodiment of the invention. The protocol stack handler 910 is configured to execute operations related to the first subscriber identity card while the protocol stack handler 920 is configured to execute operations related to the second subscriber identity card. Initially, the protocol stack handlers 910 and 920 are in the idle mode, and the protocol stack handler 920 receives a user request from the application layer 930 to perform a PS data service such as push e-mail, IM, or others, with the second service network (e.g. the service network 120) (Step S1102). Upon receiving the request for PS data service, the protocol stack handler 920 requests the protocol stack handler 910 to enter a Virtual Mode V1 to reduce the scheduled monitoring tasks associated with the first service network (e.g. the service network 130) (step S1104). In the Virtual Mode V1, the protocol stack handler 910 is configured to perform scheduled monitoring tasks by using a reduced number of neighbor cells to be monitored. For example, the protocol stack handler 910 may be communicating with a GSM/GPRS network, wherein the protocol stack handler 910 may monitor up to 6 neighbor cells in the GSM/GPRS network (as illustrated in FIG. 9). Specifically, the protocol stack handler 910 may monitor the neighbor cells by performing scheduled monitoring tasks to the BCCHs and/or BSICs which are associated with the neighbor cells. After the protocol stack handler 910 enters the Virtual Mode V1, the protocol stack handler 910 may perform scheduled monitoring tasks by using a reduced number of neighbor cells to be monitored, such as 1, 2, 3 or 4 neighbor cells with the strongest signals (e.g. the received signal level (RXLEV) in the BCCH). The number of neighbor cells to be monitored may be a predefined fixed value or a variable value which depends on the network signal quality. In another embodiment, the protocol stack handler 910 may be communicating with a UMTS network, and the protocol stack handler 910 may monitor the neighbor cells by performing scheduled monitoring tasks to the BCCHs which are associated with the neighbor cells. FIG. 12 is a diagram illustrating the channel occupancy time for an MS in the Virtual Mode V1 according to an embodiment of the invention. In the embodiment in FIG. 12, the MS performs the 2G CS paging channel monitoring 904, the BCCH decoding 906 and/or the BSIC decoding 908 with the 2G serving cell and/or 2 other 2G neighbor cells. Compared to the embodiment illustrated in FIG. 9, there is a reduced number of neighbor cells to be monitored (the number of cells decreased from 6 to 2) in the embodiment in FIG. 12. Since the MS is not required to use the single radio resource hardware such as a single antenna or single RF module to perform the scheduled monitoring tasks of the BCCH decoding 906 and/or the BSIC decoding 908, the data rate of the 3G PS data signal 1202 is enhanced. The use of the Virtual Mode V1 may be extended to any 2G/3G/4G scheduled monitoring tasks with a subscriber identity card when another subscriber identity card is performing a 2G/3G/4G PS data service, and the invention is not limited thereto. For example, the MS may be equipped with a USIM card (the first subscriber identity card) that performs the scheduled neighbor cell monitoring tasks to the serving cell/neighbor cells in a UMTS service network while performing the PS data service with a 4G LTE SIM card (the second subscriber identity card). Or alternatively, the MS may be equipped with a SIM card (the first subscriber identity card) that performs the scheduled neighbor cell monitoring tasks to the serving cell/neighbor cells in a GSM/GPRS service network while performing the PS data service with a CSIM card (the second subscriber identity card).

Upon entering the Virtual Mode V1, the protocol stack handler 910 may acknowledge to the protocol stack handler 920 that the Virtual Mode V1 has been entered (Step S1106). The protocol stack handler 920 may use a flag or marker to note the condition of entering the Virtual Mode V1 when the protocol stack handler 910 has entered the Virtual Mode V1, e.g. the default value of the flag or marker may be set to "OFF", the value of the flag or marker may be set to "ON" when the protocol stack handler 910 has entered the Virtual Mode V1, and the value of the flag or marker may be set to "OFF" when the protocol stack handler 910 has exited the Virtual Mode V1. After the acknowledgement from the protocol stack handler 910 is received, the protocol stack handler 920 starts to perform the PS data service instructed by the application layer 930 (Step S1108). In order to perform the PS data service, the protocol stack handler 920 may perform the GPRS attach procedure as illustrated in FIG. 3 or the PDP context activation procedure as illustrated in FIG. 4. Next, the protocol stack handler 910 may perform scheduled monitoring tasks by using a reduced number of neighbor cells to be monitored in the Virtual Mode V1 (Step 1110). After the PS data service is performed, the current PS session to perform the PS data service is terminated for the protocol stack handler 920 (Step 1112). The PS data service may be terminated due to various reasons. For example, the protocol stack handler 920 may receive an instruction from the application layer 930, such as a termination instruction for an e-mail application, an IM application, or a web browsing application. Or alternatively, the PS data service may be terminated by the network due to a time out. After the current PS session to perform the PS data service has been terminated, the protocol stack handler 920 may request the protocol stack handler 910 to exit the Virtual Mode V1 (Step 1114). Upon receiving the request, the protocol stack handler 910 may exit the Virtual Mode V1 to monitor the original number of neighbor cells (e.g. 6 neighbor cells for a GSM/GPRS network) (Step 1116). The protocol stack handler 910 may further acknowledge to the protocol stack handler 920 that it has successfully exited the Virtual Mode V1.

Figure 13:
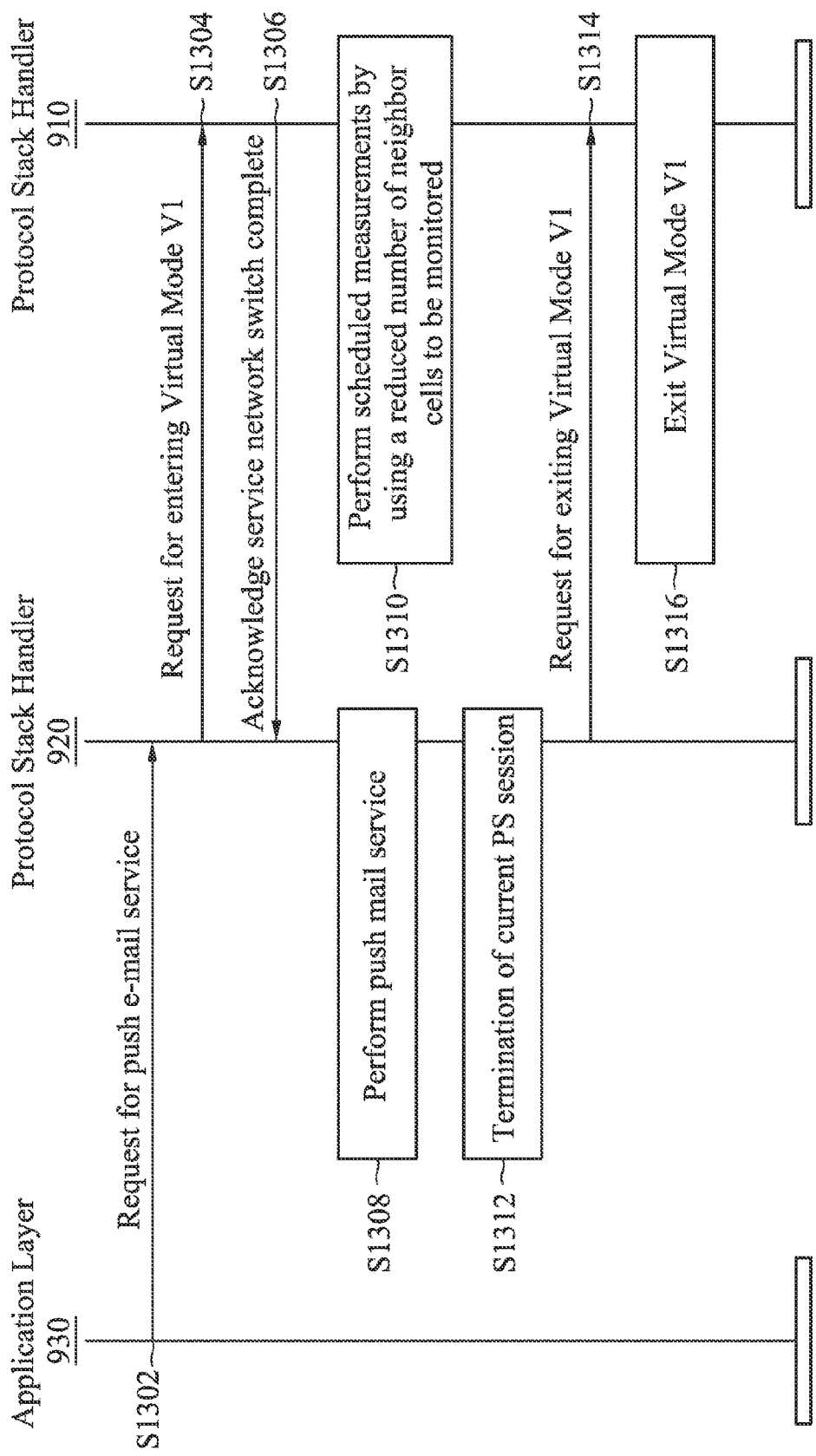
FIG. 13 is a message sequence chart illustrating the method for enhancing the data rate for a packet-switched (PS) data service according to the embodiment of FIG. 11.

FIG. 13 is a message sequence chart illustrating the method for eliminating performance degradation for a packet-switched (PS) data service according to the embodiment of FIG. 11. Similarly, the protocol stack handlers 910 and 920 are in the idle mode at the beginning, and the protocol stack handler 920 receives a user request from the application layer 930 to perform a PS data service such as a push e-mail service with the second service network (e.g. the service network 120) (Step S1302). Upon receiving the request for PS data service, the protocol stack handler 920 requests the protocol stack handler 910 to enter a Virtual Mode V1 to reduce the scheduled monitoring tasks associated with the first service network (e.g. the service network 130) (step S1304). In the Virtual Mode V1, the protocol stack handler 910 is configured to perform scheduled monitoring tasks by using a reduced number of neighbor cells to be monitored. For example, the protocol stack handler 910 may be communicating with a GSM/GPRS network, wherein the protocol stack handler 910 may reduce the number of the neighbor cells to be monitored, for example, the protocol stack handler 910 may be communicating with a GSM/GPRS network, and the protocol stack handler 910 may reduce the number of the neighbor cells to be monitored from 6 to 1, 2, 3, or 4. Different rules for the number of neighbor cells to be monitored may be specified for networks using other RATs (e.g. the UMTS RAT, the CDMA RAT, the LTE RAT and so on). It is assumed that these rules relating to the number of neighbor cells are to be known by those skilled in the art, thus, detailed descriptions are not provided. Upon entering the Virtual Mode V1, the protocol stack handler 910 may acknowledge to the protocol stack handler 920 that the Virtual Mode V1 has been entered (Step S1306). After the acknowledgement from the protocol stack handler 910 is received, the protocol stack handler 920 starts to perform the PS data service instructed by the application layer 930 (Step S1308). In order to perform the PS data service, the protocol stack handler 910 may perform the GPRS attach procedure as illustrated in FIG. 3 or the PDP context activation procedure as illustrated in FIG. 4. Next, the protocol stack handler 910 may perform scheduled monitoring tasks by using a reduced number of neighbor cells to be monitored in the Virtual Mode V1 (Step 1310). After the PS data service is performed, the current PS session to perform the PS data service is terminated for the protocol stack handler 920 (Step 1312). The PS data service may be terminated due to various reasons. For example, the protocol stack handler 920 may receive an instruction from the application layer 930, such as a termination instruction for an e-mail application, an IM application, or a web browsing application. Or alternatively, the PS data service may be terminated by the network due to a time out. After the current PS session to perform the PS data service has been terminated, the protocol stack handler 920 may request the protocol stack handler 910 to exit the Virtual Mode V1 (Step 1314). Upon receiving the request, the protocol stack handler 910 may exit the Virtual Mode V1 to monitor the original number of neighbor cells (e.g. 6 neighbor cells for a GSM/GPRS network) (Step 1316). The protocol stack handler 910 may further acknowledge to the protocol stack handler 920 that it has successfully exited the Virtual Mode V1.

Figure 14:
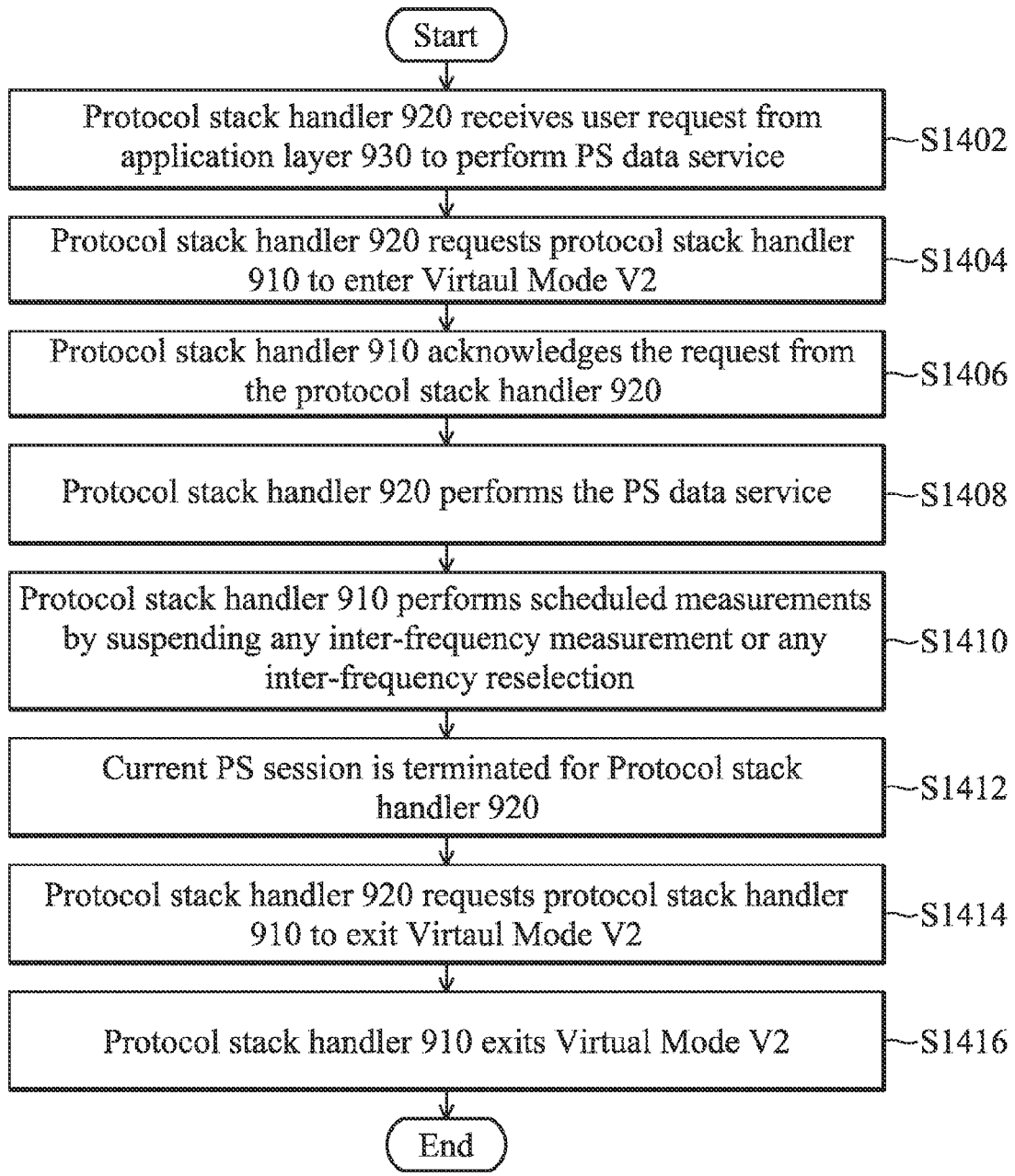
FIG. 14 is a flow chart illustrating a method for enhancing the data rate for a packet-switched (PS) data service by using the software architecture of FIG. 10 according to another embodiment of the invention.

FIG. 14 is a flow chart illustrating a method for eliminating performance degradation for a packet-switched (PS) data service by using the software architecture of FIG. 10 according to another embodiment of the invention. The protocol stack handler 910 is configured to execute operations related to the first subscriber identity card while the protocol stack handler 920 is configured to execute operations related to the second subscriber identity card. Initially, the protocol stack handlers 910 and 920 are in the idle mode, and the protocol stack handler 920 receives a user request from the application layer 930 to perform a PS data service such as push e-mail, IM, or others, with the second service network (Step S1402). Upon receiving the request for PS data service, the protocol stack handler 920 requests the protocol stack handler 910 to enter a Virtual Mode V2 to reduce the scheduled monitoring tasks associated with the first service network (step S1404). In the Virtual Mode V2, the protocol stack handler 910 is configured to perform scheduled monitoring tasks by suspending the inter-frequency measurement and the inter-frequency reselection associated with the second subscriber identity card. In the idle mode, and the protocol stack handler 910 may perform a new measurement to the serving cell and the neighbor cells at least every DRX cycle (as illustrated in FIG. 8). When the first service network is a UMTS network, the protocol stack handler 910 may perform the intra-frequency measurements and/or the inter-frequency measurements to the serving cell and/or the neighbor cells, wherein the intra-frequency measurements are the measurements made for the neighbor cells with the same frequency as the serving cell, and the inter-frequency measurements are the measurements made for the neighbor cells with different frequencies as the serving cell. The intra-frequency measurements or the inter-frequency measurements may be made for the CPICH of the serving cell and/or the neighbor cells. In the Virtual Mode V2, the protocol stack handler 910 may be configured to suspend the inter-frequency measurements which take more time to perform than the intra-frequency measurements. Since the inter-frequency measurements are suspended, the protocol stack handler 910 may also suspends the inter-frequency reselections. The protocol stack handler 910 may therefore decrease the time to use the single radio resource hardware such as a single antenna or single RF module for the scheduled monitoring tasks, thereby enhancing the data rate of the PS data service associated with the second subscriber identity card. The Virtual Mode V2 may also be applied when the first service network is a service network supporting other 3G/4G RATs, such as the CDMA RAT, the LTE RAT, the WiMAX RAT, or others, and the invention should not be limited thereto.

In an embodiment, when the signal quality of the serving cell is not sufficient to satisfy the selection criteria (e.g. the S-criterion for the UMTS RAT), and the protocol stack handler 910 is starting to count down for entering the out-of-service state (e.g. a limited service state which only allows for making emergency calls), the protocol stack handler 910 may be allowed to perform the inter-frequency measurement and the inter-frequency cell reselection once. Once the protocol stack handler 910 has performed an inter-frequency cell reselection, the inter-frequency measurements and the inter-frequency cell reselections are suspended again. In another embodiment, the protocol stack handler 910 may be allowed to perform a frequency scan procedure (such as the PLMN search procedure as described previously) when the protocol stack handler 910 has already entered the out-of-service state.

Upon entering the Virtual Mode V2, the protocol stack handler 910 may acknowledge to the protocol stack handler 920 that the Virtual Mode V2 has been entered (Step S1406). Similarly, the protocol stack handler 920 may use a flag or marker to note the condition of entering the Virtual Mode V2 when the protocol stack handler 910 has entered the Virtual Mode V2, e.g. the default value of the flag or marker may be set to "OFF", the value of the flag or marker may be set to "ON" when the protocol stack handler 910 has entered the Virtual Mode V2, and the value of the flag or marker may be set to "OFF" when the protocol stack handler 910 has exited the Virtual Mode V2. After the acknowledgement from the protocol stack handler 910 is received, the protocol stack handler 920 starts to perform the PS data service instructed by the application layer 930 (Step S1408). In order to perform the PS data service, the protocol stack handler 920 may perform the GPRS attach procedure as illustrated in FIG. 3 or the PDP context activation procedure as illustrated in FIG. 4. Next, the protocol stack handler 910 may perform the scheduled monitoring tasks by suspending the inter-frequency measurement and the inter-frequency reselection in the Virtual Mode V2 (Step 1410). After the PS data service is performed, the current PS session to perform the PS data service is terminated for the protocol stack handler 920 (Step 1412). After the current PS session to perform the PS data service has been terminated, the protocol stack handler 920 may request the protocol stack handler 910 to exit the Virtual Mode V2 (Step 1414). Upon receiving the request, the protocol stack handler 910 may exit the Virtual Mode V2 to resume the inter-frequency measurements and the inter-frequency cell reselections (Step 1416). The protocol stack handler 910 may further acknowledge to the protocol stack handler 920 that it has successfully exited the Virtual Mode V2.

Figure 15:
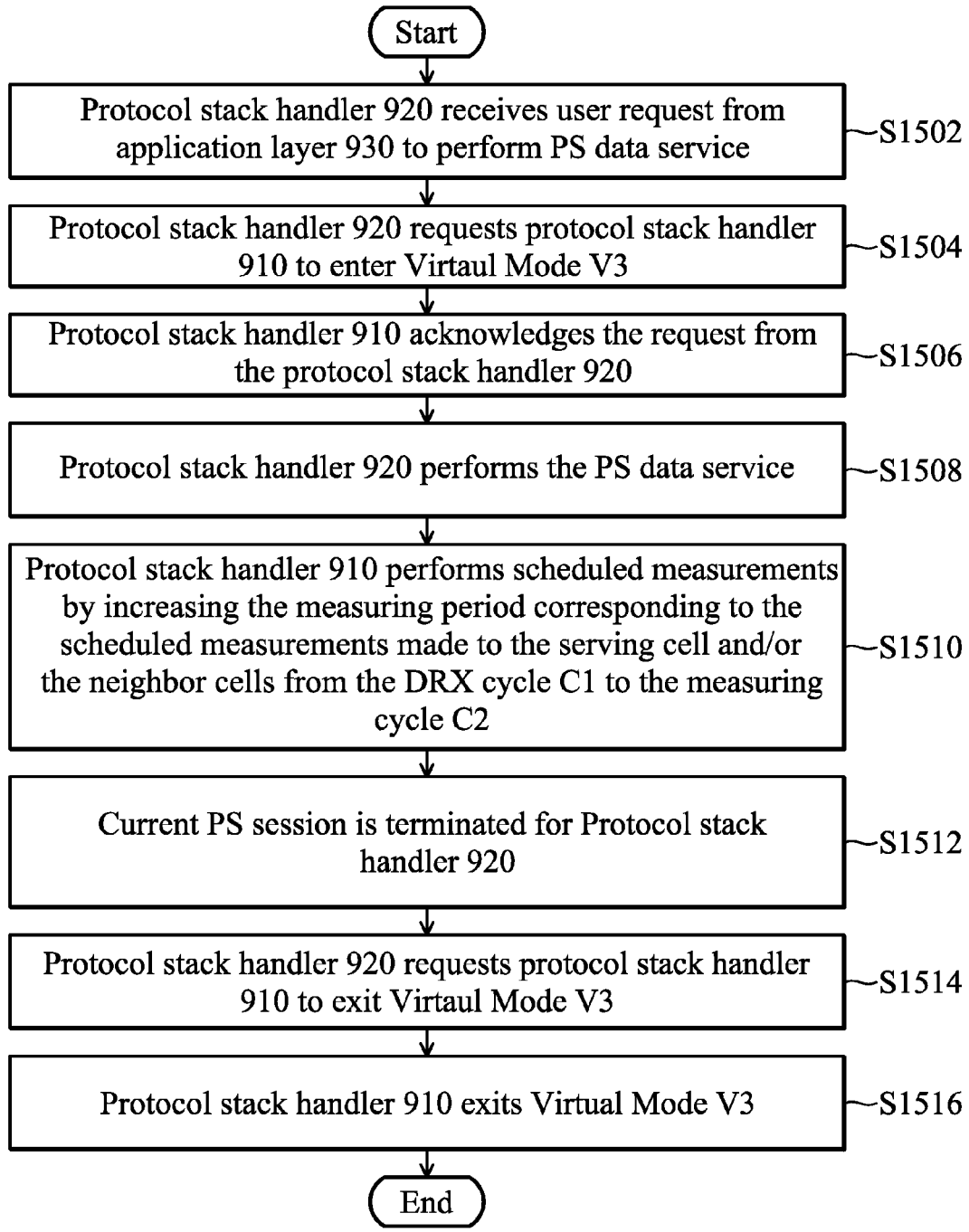
FIG. 15 is a flow chart illustrating a method for enhancing the data rate for a packet-switched (PS) data service by using the software architecture of FIG. 10 according to another embodiment of the invention.

FIG. 15 is a flow chart illustrating a method for eliminating performance degradation for a packet-switched (PS) data service by using the software architecture of FIG. 10 according to another embodiment of the invention. The protocol stack handler 910 is configured to execute operations related to the first subscriber identity card while the protocol stack handler 920 is configured to execute operations related to the second subscriber identity card. Similarly, the protocol stack handlers 910 and 920 are in the idle mode initially, and the protocol stack handler 920 receives a user request from the application layer 930 to perform a PS data service such as push e-mail, IM, or others, with the second service network (Step S1502). Upon receiving the request for PS data service, the protocol stack handler 920 requests the protocol stack handler 910 to enter a Virtual Mode V3 to reduce the scheduled monitoring tasks associated with the first service network (step S1504). In the Virtual Mode V3, the protocol stack handler 910 increases a measuring period corresponding to the scheduled monitoring tasks made to the serving cell and/or the neighbor cells from a DRX cycle C1 to a measuring cycle C2. As described previously, in the idle mode, and the protocol stack handler 910 may listen for paging messages and/or perform scheduled monitoring tasks at least once per DRX cycle (as illustrated in FIG. 8). After the protocol stack handler 910 has entered the Virtual Mode V3, the protocol stack handler 910 may reduce the scheduled monitoring tasks by increasing the measuring period corresponding to the scheduled monitoring tasks made to the serving cell and/or the neighbor cells from a DRX cycle C1 to a measuring cycle C2, wherein the measuring cycle C2 is larger than the DRX cycle C1. In one embodiment, the measuring cycle C2 may be N times (e.g. 2, 3, 4 times) the DRX cycle, and the value of N may be a fixed or variable positive number. In another embodiment, the DRX cycle C1 may be smaller than a predetermined time M. When the DRX cycle C1 is smaller than the predetermined time M (e.g. M=1.28 seconds or 2.56 seconds), the protocol stack handler 910 may use the predetermined time M as the measuring cycle C2 to perform the scheduled monitoring tasks of the serving cell or the neighboring cells. In another embodiment, the protocol stack handler 910 may restore the measuring period corresponding to the scheduled monitoring tasks made to the serving cell and/or the neighbor cells from the measuring cycle C2 to the DRX cycle C1 when the cell quality (e.g. the S-criterion, the CPICH RSCP, the CPICH Ec/No and so on) of the serving cell or the neighboring cells is degraded to a pre-determined level. The Virtual Mode V3 may also be applied when the first service network is a service network supporting other 2G/3G/4G RATs, such as the CDMA RAT, the LTE RAT, the WiMAX RAT, or others, and the invention should not be limited thereto.

Upon entering the Virtual Mode V3, the protocol stack handler 910 may acknowledge to the protocol stack handler 920 that the Virtual Mode V3 has been entered (Step S1506). Similarly, the protocol stack handler 920 may use a flag or marker to note the condition of entering the Virtual Mode V3 when the protocol stack handler 910 has entered the Virtual Mode V3, e.g. the default value of the flag or marker may be set to "OFF", the value of the flag or marker may be set to "ON" when the protocol stack handler 910 has entered the Virtual Mode V3, and the value of the flag or marker may be set to "OFF" when the protocol stack handler 910 has exited the Virtual Mode V3. After the acknowledgement from the protocol stack handler 910 is received, the protocol stack handler 920 starts to perform the PS data service instructed by the application layer 930 (Step S1508). In order to perform the PS data service, the protocol stack handler 920 may perform the GPRS attach procedure as illustrated in FIG. 3 or the PDP context activation procedure as illustrated in FIG. 4. Next, the protocol stack handler 910 may perform scheduled monitoring tasks by increasing the measuring period corresponding to the scheduled monitoring tasks made to the serving cell and/or the neighbor cells from the DRX cycle C1 to the measuring cycle C2 in the Virtual Mode V3 (Step 1510). After the PS data service is performed, the current PS session to perform the PS data service is terminated for the protocol stack handler 920 (Step 1512). After the current PS session to perform the PS data service has been terminated, the protocol stack handler 920 may request the protocol stack handler 910 to exit the Virtual Mode V3 (Step 1514). Upon receiving the request, the protocol stack handler 910 may exit the Virtual Mode V3 to restore the measuring period corresponding to the scheduled monitoring tasks made to the serving cell and/or the neighbor cells back to the DRX cycle C1 (Step 1516). The protocol stack handler 910 may further acknowledge to the protocol stack handler 920 that it has successfully exited the Virtual Mode V3.

Figure 16:
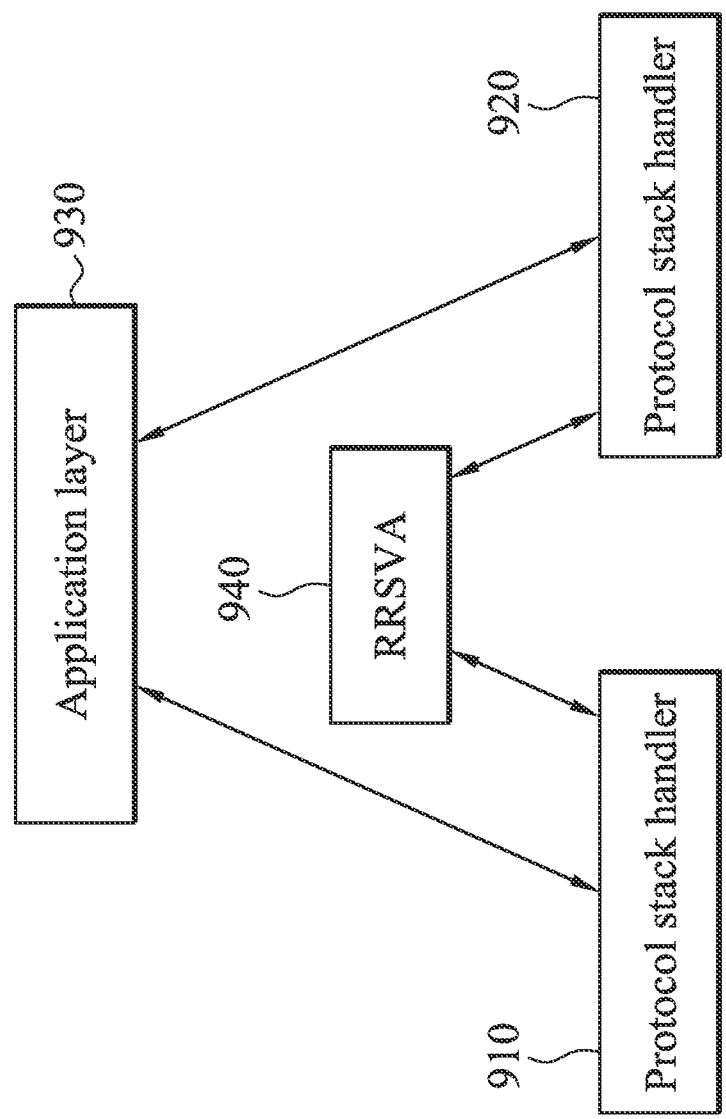
FIG. 16 is a block diagram illustrating the software architecture of an MS according to another embodiment of the invention.

FIG. 16 is a block diagram illustrating the software architecture of an MS according to another embodiment of the invention. Similar to FIG. 10, the exemplary software architecture also contains the protocol stack handlers 910 and 920, and the application layer 930. Additionally, a resource reservation arbitrator (RRSVA) 940 is included, which solves conflicts between the protocol stack handlers 910 and 920 and arbitrates which one of the protocol stack handlers 910 and 920 may occupy the radio resource hardware at a given time. The RRSVA 940 may be implemented in program code and, when the program code is loaded and executed by the processing unit or MCU, granting or rejecting of radio resource requests issued by any of the protocol stack handlers 910 and 920 in terms of predefined rules with the priorities of the requested traffics may be performed. The RRSVA 940 may also be implemented in program code to decrease the scheduled monitoring tasks of the subscriber identity card in idle mode in order to enhance the data rate of the PS data service. For example, the RRSVA may request the protocol stack handlers 910 to decrease the scheduled monitoring tasks by requesting the protocol stack handlers 910 to enter the Virtual Mode 1, Virtual Mode 2 and/or Virtual Mode 3.

Figure 17:
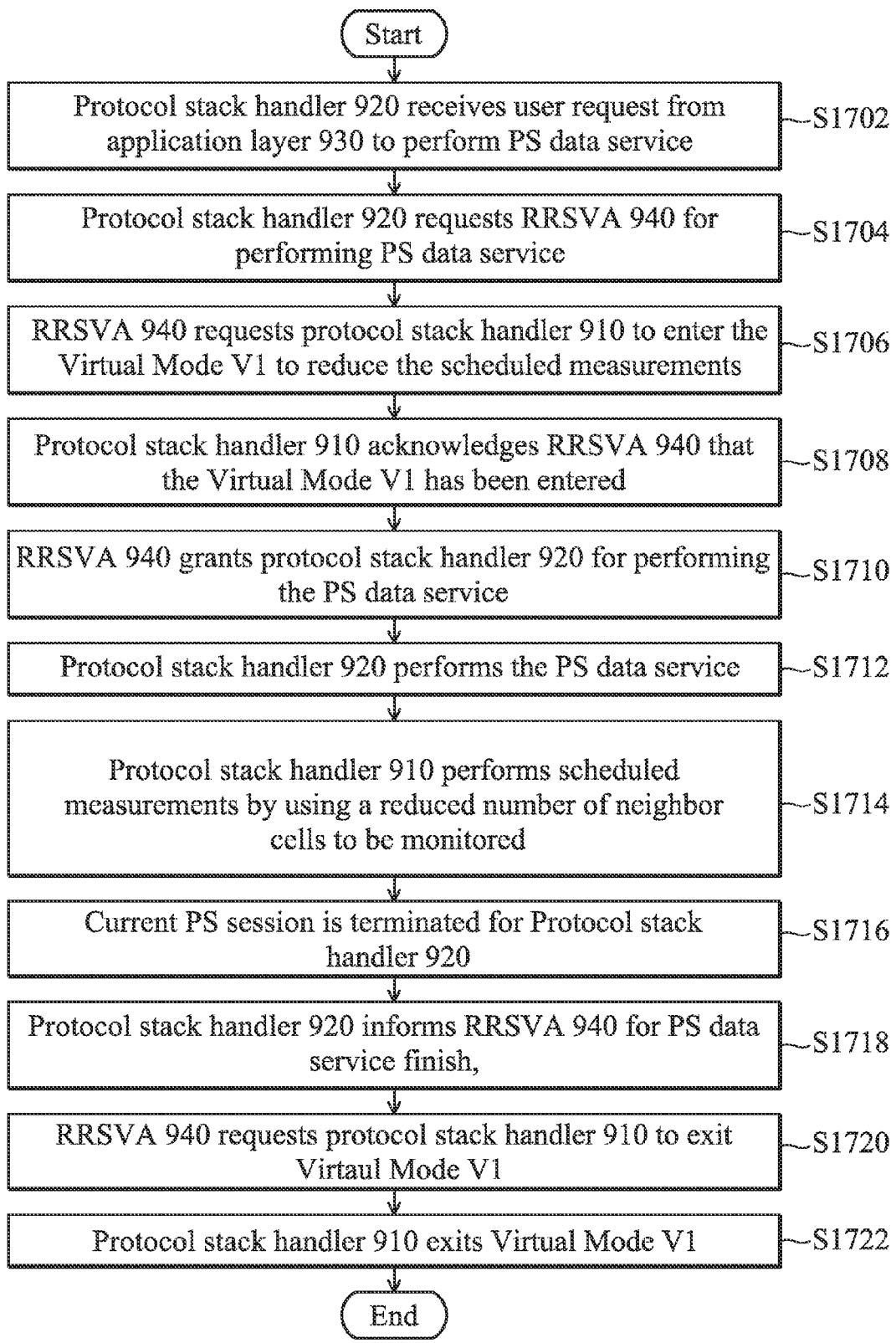
FIG. 17 is a flow chart illustrating a method for enhancing the data rate for a packet-switched (PS) data service by using the software architecture of FIG. 16 according to an embodiment of the invention.

FIG. 17 is a flow chart illustrating a method for eliminating performance degradation for a packet-switched (PS) data service by using the software architecture of FIG. 16 according to an embodiment of the invention. The protocol stack handler 910 is configured to execute operations related to the first subscriber identity card while the protocol stack handler 920 is configured to execute operations related to the second subscriber identity card. Initially, the protocol stack handlers 910 and 920 are in the idle mode, and the protocol stack handler 920 receives a user request from the application layer 930 to perform a PS data service (Step S1702). Upon receiving the request for PS data service, the protocol stack handler 920 requests the RRSVA 940 to perform the PS data service (Step S1704). In response to the request, the RRSVA requests the protocol stack handler 910 to enter a Virtual Mode V1 to reduce the scheduled monitoring tasks (step S1706). Reference for detailed descriptions regarding the operations in the Virtual Mode V1 may be made to the aforementioned descriptions relating to FIG. 11. Upon entering the Virtual Mode V1, the protocol stack handler 910 may acknowledge to the RRSVA 940 that the Virtual Mode V1 has been entered (Step S1708), and the RRSVA 940 may grant the protocol stack handler 920 to perform the PS data service after the acknowledgement from the protocol stack handler 910 is received (Step S1710). Subsequently, the protocol stack handler 920 starts to perform the PS data service instructed by the application layer 930 (Step S1712). Next, the protocol stack handler 910 may perform scheduled monitoring tasks by using a reduced number of neighbor cells to be monitored in the Virtual Mode V1 (Step 1714). After the PS data service is performed, the current PS session to perform the PS data service may be terminated for the protocol stack handler 920 (Step 1716). After the current PS session to perform the PS data service has been terminated, the protocol stack handler 920 may inform the RRSVA 940 for PS data service finish (Step 1718). Then, the RRSVA 940 may request the protocol stack handler 910 to exit the Virtual Mode V1 (Step 1720). Upon receiving the request, the protocol stack handler 910 may exit the Virtual Mode V1 to monitor the original number of neighbor cells (e.g. 6 neighbor cells for a GSM/GPRS network) (Step 1722). The protocol stack handler 910 may further acknowledge to the RRSVA 940 that it has successfully exited the Virtual Mode V1.

Figure 18:
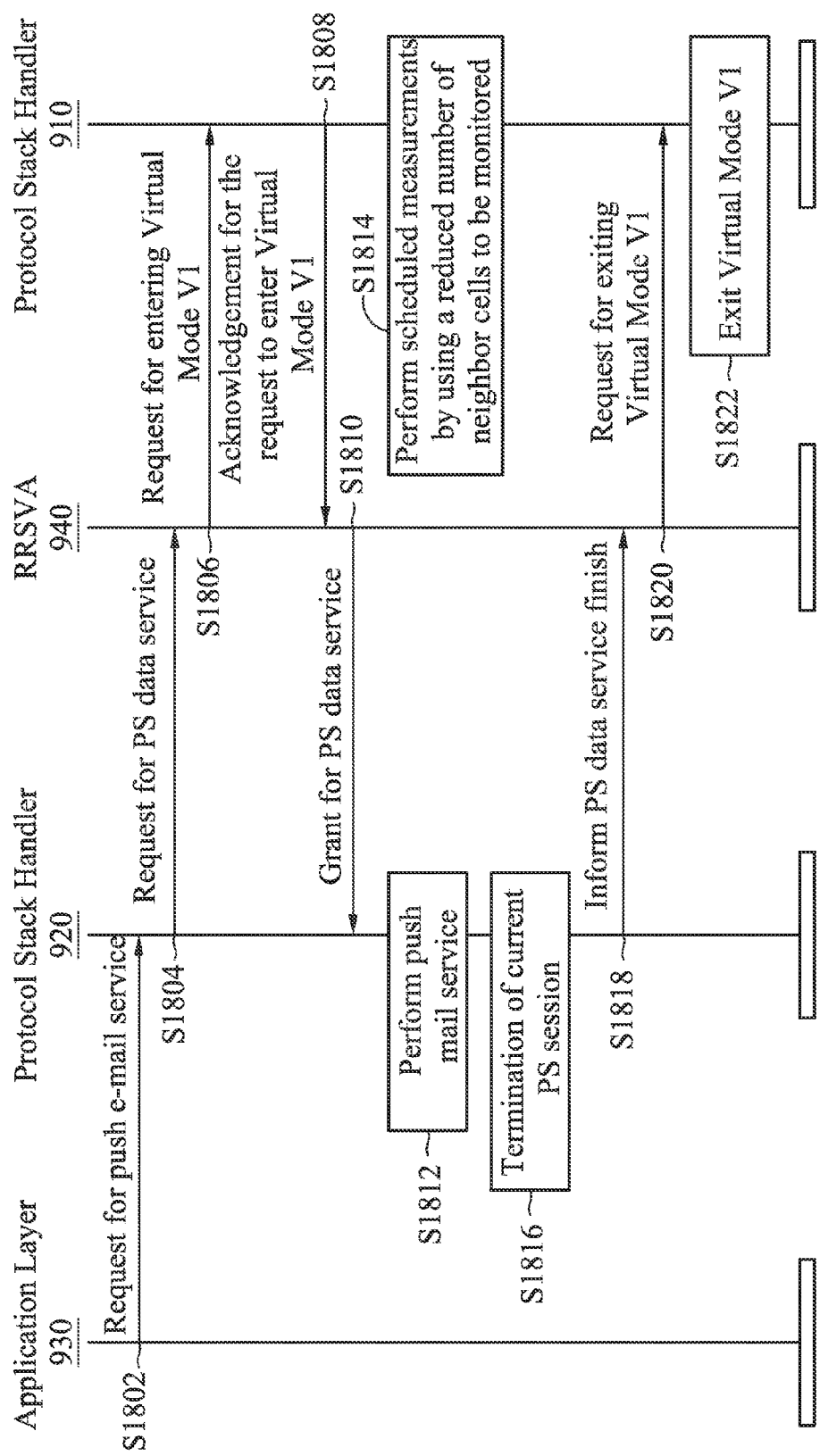
FIG. 18 is a message sequence chart illustrating the method for enhancing the data rate for a packet-switched (PS) data service according to the embodiment of FIG. 17

FIG. 18 is a message sequence chart illustrating the method for eliminating performance degradation for a packet-switched (PS) data service according to the embodiment of FIG. 17. Similarly, the protocol stack handlers 910 and 920 are in the idle mode at the beginning, and the protocol stack handler 920 receives a user request from the application layer 930 to perform a PS data service (Step S1802). Upon receiving the request for PS data service, the protocol stack handler 920 requests the RRSVA 940 to perform the PS data service (step S1804). In response to the request, the RRSVA requests the protocol stack handler 910 to enter a Virtual Mode V1 to reduce the scheduled measurements monitoring tasks (step S1806). Reference for detailed descriptions regarding the operations in the Virtual Mode V1 may be made to the aforementioned descriptions relating to FIG. 11. Upon entering the Virtual Mode V1, the protocol stack handler 910 may acknowledge to the RRSVA 940 that the Virtual Mode V1 has been entered (Step S1808), and the RRSVA 940 may grant the protocol stack handler 920 to perform the PS data service after the acknowledgement from the protocol stack handler 910 is received (Step S1810). Subsequently, the protocol stack handler 920 starts to perform the PS data service instructed by the application layer 930 (Step S1812). Next, the protocol stack handler 910 may perform scheduled monitoring tasks by using a reduced number of neighbor cells to be monitored in the Virtual Mode V1 (Step 1814). After the PS data service is performed, the current PS session to perform the PS data service may be terminated for the protocol stack handler 920 (Step 1816). After the current PS session to perform the PS data service has been terminated, the protocol stack handler 920 may inform the RRSVA 940 for PS data service finish (Step 1818). Then, the RRSVA 940 may request the protocol stack handler 910 to exit the Virtual Mode V1 (Step 1820). Upon receiving the request, the protocol stack handler 910 may exit the Virtual Mode V1 to monitor the original number of neighbor cells (e.g. 6 neighbor cells for a GSM/GPRS network) (Step 1822). The protocol stack handler 910 may further acknowledge to the RRSVA 940 that it has successfully exited the Virtual Mode V1.

Figure 19:
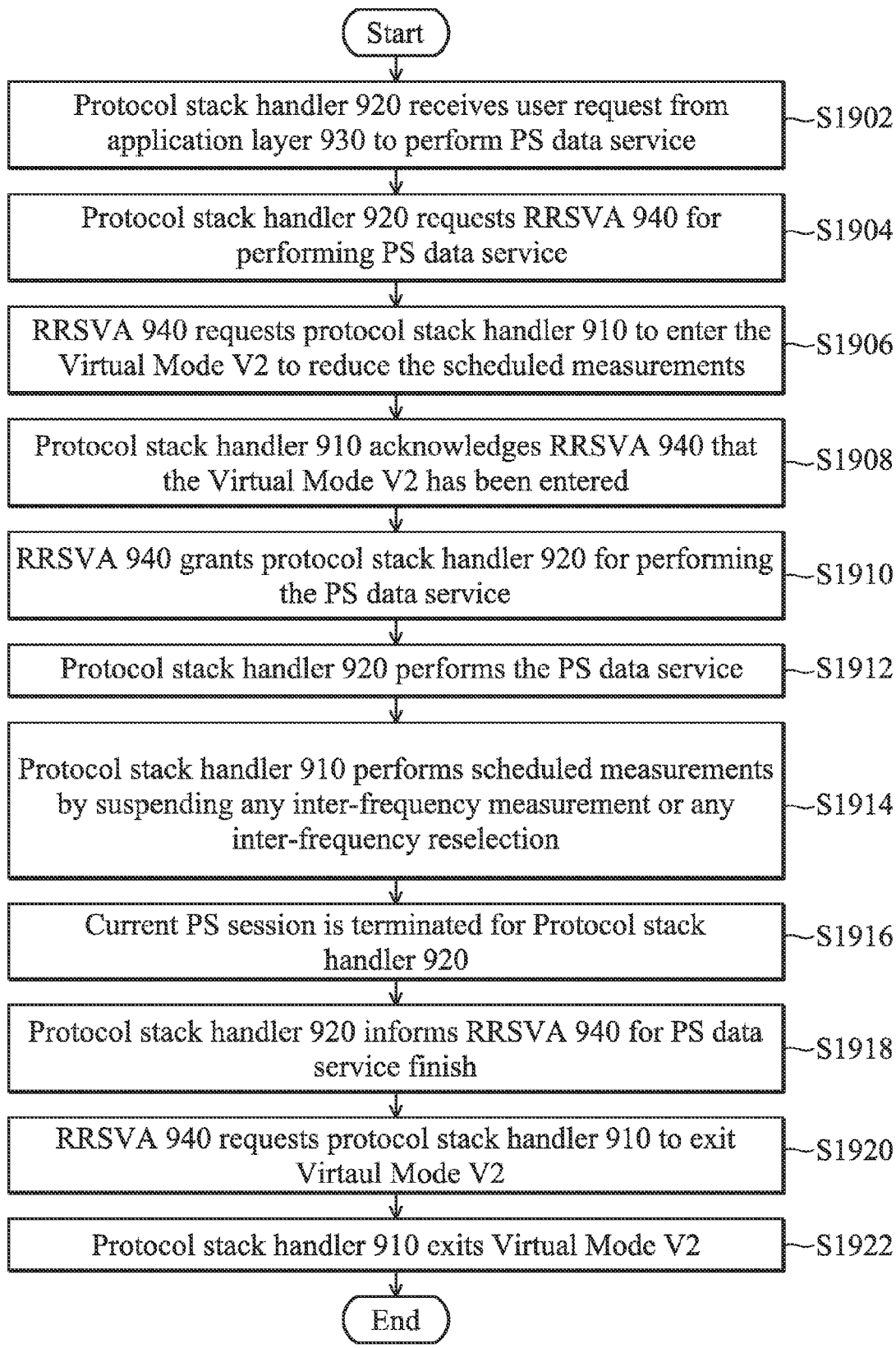
FIG. 19 is flow chart illustrating a method for enhancing the data rate for a packet-switched (PS) data service by using the software architecture of FIG. 16 according to another embodiment of the invention.

FIG. 19 is flow chart illustrating a method for eliminating performance degradation for a packet-switched (PS) data service by using the software architecture of FIG. 16 according to another embodiment of the invention. Similarly, the protocol stack handlers 910 and 920 are in the idle mode at the beginning, and the protocol stack handler 920 receives a user request from the application layer 930 to perform a PS data service (Step S1902). Upon receiving the request for PS data service, the protocol stack handler 920 requests the RRSVA 940 to perform the PS data service (step S1904). In response to the request, the RRSVA requests the protocol stack handler 910 to enter a Virtual Mode V2 to reduce the scheduled monitoring tasks (step S1906). In the Virtual Mode V2, the protocol stack handler 910 is configured to perform scheduled monitoring tasks by suspending the inter-frequency measurement and the inter-frequency reselection associated with the second subscriber identity card. Reference for detailed descriptions regarding the operations in the Virtual Mode V2 may be made to the aforementioned descriptions relating to FIG. 14. Upon entering the Virtual Mode V2, the protocol stack handler 910 may acknowledge to the RRSVA 940 that the Virtual Mode V2 has been entered (Step S1908), and the RRSVA 940 may grant the protocol stack handler 920 to perform the PS data service after the acknowledgement from the protocol stack handler 910 is received (Step S1910). Subsequently, the protocol stack handler 920 starts to perform the PS data service instructed by the application layer 930 (Step S1912). Then, the protocol stack handler 910 may perform the scheduled monitoring tasks by suspending the inter-frequency measurement and the inter-frequency reselection in the Virtual Mode V2 (Step 1914). After the PS data service is performed, the current PS session to perform the PS data service may be terminated for the protocol stack handler 920 (Step 1916). After the current PS session to perform the PS data service has been terminated, the protocol stack handler 920 may inform the RRSVA 940 for PS data service finish (Step 1918). Then, the RRSVA 940 may request the protocol stack handler 910 to exit the Virtual Mode V2 (Step 1920). Upon receiving the request, the protocol stack handler 910 may exit the Virtual Mode V2 to resume the inter-frequency measurements and the inter-frequency cell reselections (Step 1922). The protocol stack handler 910 may further acknowledge to the RRSVA 940 that it has successfully exited the Virtual Mode V2.

Figure 20:
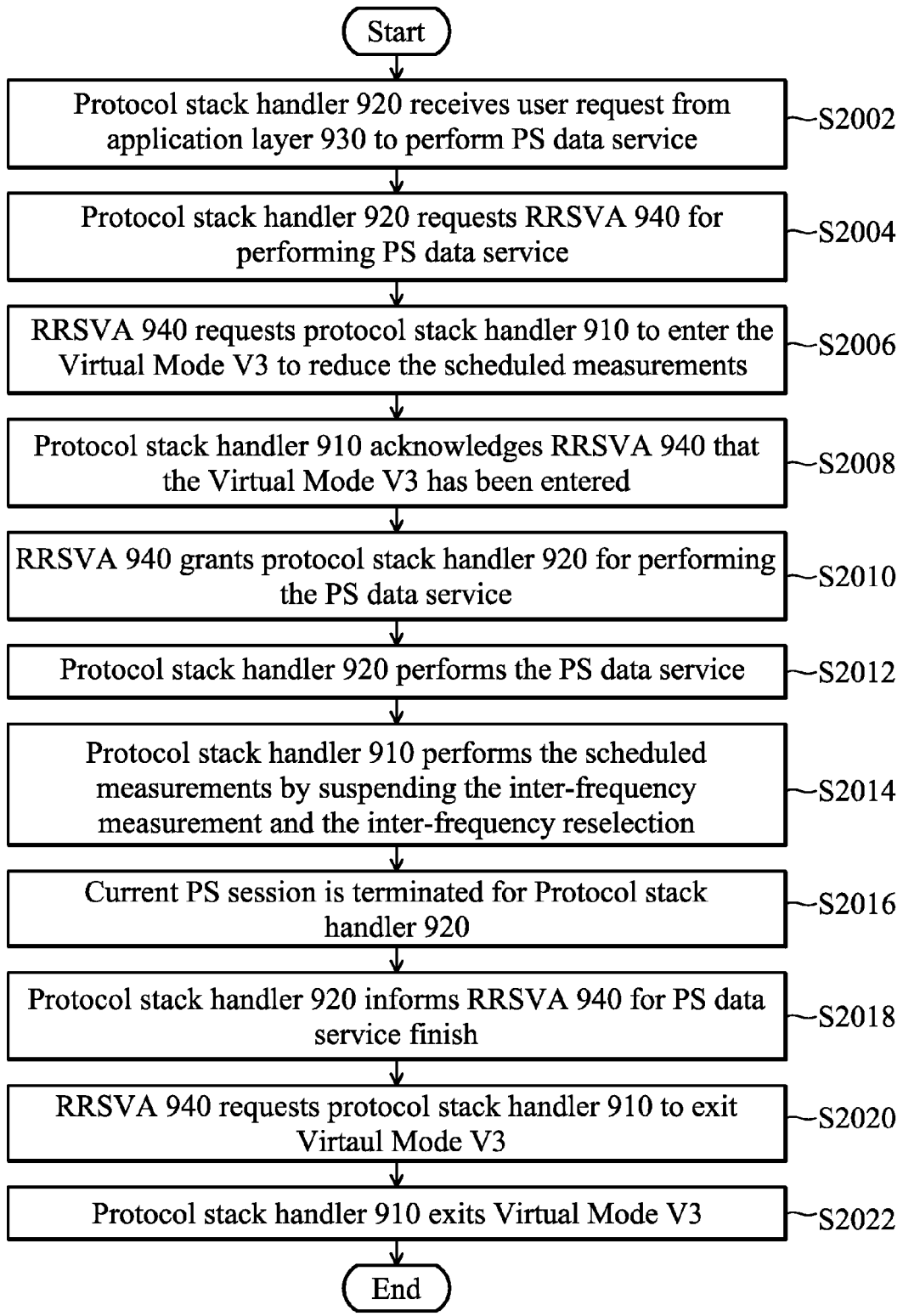
FIG. 20 is flow chart illustrating a method for enhancing the data rate for a packet-switched (PS) data service by using the software architecture of FIG. 16 according to another embodiment of the invention.

FIG. 20 is flow chart illustrating a method for eliminating performance degradation for a packet-switched (PS) data service by using the software architecture of FIG. 16 according to another embodiment of the invention. Similarly, the protocol stack handlers 910 and 920 are in the idle mode at the beginning, and the protocol stack handler 920 receives a user request from the application layer 930 to perform a PS data service (Step S2002). Upon receiving the request for PS data service, the protocol stack handler 920 requests the RRSVA 940 to perform the PS data service (step S2004). In response to the request, the RRSVA requests the protocol stack handler 910 to enter a Virtual Mode V3 to reduce the scheduled monitoring tasks (step S2006). In the Virtual Mode V3, the protocol stack handler 910 increases a measuring period corresponding to the scheduled measurements monitoring tasks made to the serving cell and/or the neighbor cells from a DRX cycle C1 to a measuring cycle C2. Reference for detailed descriptions regarding the operations in the Virtual Mode V3 may be made to the aforementioned descriptions relating to FIG. 15. Upon entering the Virtual Mode V3, the protocol stack handler 910 may acknowledge to the RRSVA 940 that the Virtual Mode V3 has been entered (Step S2008), and the RRSVA 940 may grant the protocol stack handler 920 to perform the PS data service after the acknowledgement from the protocol stack handler 910 is received (Step S2010). Subsequently, the protocol stack handler 920 starts to perform the PS data service instructed by the application layer 930 (Step S2012). Then, the protocol stack handler 910 may perform the scheduled monitoring tasks by suspending the inter-frequency measurement and the inter-frequency reselection in the Virtual Mode V3 (Step 2014). After the PS data service is performed, the current PS session to perform the PS data service may be terminated for the protocol stack handler 920 (Step 2016). After the current PS session to perform the PS data service has been terminated, the protocol stack handler 920 may inform the RRSVA 940 for PS data service finish (Step 2018). Then, the RRSVA 940 may request the protocol stack handler 910 to exit the Virtual Mode V3 (Step 2020). Upon receiving the request, the protocol stack handler 910 may exit the Virtual Mode V3 to restore the measuring period corresponding to the scheduled monitoring tasks made to the serving cell and/or the neighbor cells back to the DRX cycle C1 (Step 2022). The protocol stack handler 910 may further acknowledge to the RRSVA 940 that it has successfully exited the Virtual Mode V3.

While the invention has been described by way of example and in terms of preferred embodiment, it is to be understood that the invention is not limited thereto. Those who are skilled in this technology can still make various alterations and modifications without departing from the scope and spirit of this invention. For example, the software architectures of FIGS. 8, 16, and 22 may each be implemented in program code stored in a machine-readable storage medium, such as a magnetic tape, semiconductor, magnetic disk, optical disc (e.g., CD-ROM, DVD-ROM, etc.), or others. A Web server may store the software architectures of FIGS. 8, 16, and 22 in a machine-readable storage medium, which can be downloaded by a client computer through the Internet. When loaded and executed by the processing unit or MCU, the program code may perform the methods of FIG. 12, 14, 17, 19, 23 or 24, respectively corresponding to the software architectures of FIGS. 8, 16, and 22. Although the embodiments described above employ the GSM/GPRS, WCDMA and/or UMTS based technologies, the invention is not limited thereto. The embodiments may also be applied to other telecommunication network technologies, such as CDMA 2000, and TD-SCDMA, WiMAX, LTE, and TD-LTE technologies. Therefore, the scope of the present invention shall be defined and protected by the following claims and their equivalents.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A wireless communication device for eliminating performance degradation of a packet-switched (PS) data service, comprising:
   a processor configured to receive a request to perform the PS data service with a first subscriber identity card, reduce a plurality of scheduled monitoring tasks associated with a second subscriber identity card, and perform the PS data service with the first subscriber identity card while using the reduced scheduled monitoring tasks to maintain mobility or receive network messages with the second subscriber identity card.

2. The wireless communication device of claim 1, wherein the processor restores the scheduled monitoring tasks associated with the second subscriber identity card after the PS data service is terminated.

3. The wireless communication device of claim 1, wherein the processor reduces the scheduled monitoring tasks by reducing a number of a plurality of neighbor cells to be monitored for the second subscriber identity card.

4. The wireless communication device of claim 3, wherein the scheduled monitoring tasks comprise measurements or decoding made to a Broadcast Control Channel (BCCH), a Base Station Identity Code (BSIC) or a common pilot channel (CPICH) of the neighbor cells.

5. The wireless communication device of claim 1, wherein the processor reduces the scheduled monitoring tasks by suspending an inter-frequency measurement and an inter-frequency cell reselection.

6. The wireless communication device of claim 5, wherein the processor resumes the inter-frequency measurement and performs the inter-frequency cell reselection once when the second subscriber identity card starts counting down for entering an out-of-service state.

7. The wireless communication device of claim 5, wherein the processor performs a frequency scan procedure with the second subscriber identity card when the second subscriber identity card has entered the out-of-service state.

8. The wireless communication device of claim 1, wherein the processor reduces the scheduled monitoring tasks associated with the second subscriber identity card by increasing a measuring period corresponding to the scheduled monitoring tasks made to a neighbor cell or a serving cell from a discontinuous reception (DRX) cycle to a virtual mode cycle, wherein the virtual mode cycle is larger than the DRX cycle.

9. The wireless communication device of claim 8, wherein the processor restores the measuring period back to the DRX cycle when a quality factor of the serving cell is degraded to a pre-determined level.

10. The wireless communication device of claim 8, wherein the scheduled monitoring tasks comprise measurements made to a common pilot channel (CPICH) associated with the neighbor cell or the serving cell.

11. A wireless communication method for eliminating performance degradation of a packet-switched (PS) data service, comprising:
receiving a request to perform the PS data service with a first subscriber identity card;
reducing a plurality of scheduled monitoring tasks associated with a second subscriber identity card; and
performing the PS data service with the first subscriber identity card while using the reduced scheduled monitoring tasks to maintain mobility or receive network messages with the second subscriber identity card.

12. The wireless communication method of claim 11, further comprising:
restoring the scheduled monitoring tasks associated with the second subscriber identity card after the PS data service is terminated.

13. The wireless communication method of claim 11, further comprising:
reducing the scheduled monitoring tasks by reducing a number of a plurality of neighbor cells to be monitored for the second subscriber identity card.

14. The wireless communication method of claim 13, wherein the scheduled monitoring tasks comprise measurements or decoding made to a Broadcast Control Channel (BCCH), a Base Station Identity Code (BSIC) or a common pilot channel (CPICH) of the neighbor cells.

15. The wireless communication method of claim 11, further comprising:
reducing the scheduled monitoring tasks by suspending an inter-frequency measurement and an inter-frequency cell reselection.

16. The wireless communication method of claim 15, further comprising:
resuming the inter-frequency measurement and performing the inter-frequency cell reselection once the second subscriber identity card starts counting down for entering an out-of-service state.

17. The wireless communication method of claim 15, wherein a frequency scan procedure is performed with the second subscriber identity card when the second subscriber identity card has entered the out-of-service state.

18. The wireless communication method of claim 11, further comprising reducing the scheduled monitoring tasks associated with the second subscriber identity card by increasing a measuring period corresponding to the scheduled monitoring tasks made to a neighbor cell or a serving cell from a discontinuous reception (DRX) cycle to a virtual mode cycle, wherein the virtual mode cycle is larger than the DRX cycle.

19. The wireless communication method of claim 18, wherein the measuring period is restored back to the DRX cycle when a quality factor of the serving cell is degraded to a pre-determined level.

20. The wireless communication method of claim 18, wherein the scheduled monitoring tasks comprise measurements made to a common pilot channel (CPICH) associated with the neighbor cell or the serving cell.

* * * * *